(12) United States Patent
Wallace

(10) Patent No.: US 9,063,002 B2
(45) Date of Patent: Jun. 23, 2015

(54) BROADBAND, COMMON-PATH, INTEROMETRIC WAVEFRONT SENSOR

(71) Applicant: California Institute of Technology, Pasadena, CA (US)

(72) Inventor: James Kent Wallace, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 157 days.

(21) Appl. No.: 13/747,235

(22) Filed: Jan. 22, 2013

(65) Prior Publication Data

US 2013/0188194 A1 Jul. 25, 2013

Related U.S. Application Data

(60) Provisional application No. 61/589,048, filed on Jan. 20, 2012.

(51) Int. Cl.
*G01B 9/02* (2006.01)
*G01J 1/20* (2006.01)
*G01J 9/02* (2006.01)
*G01J 9/00* (2006.01)

(52) U.S. Cl.
CPC ..... *G01J 9/02* (2013.01); *G01J 9/00* (2013.01)

(58) Field of Classification Search
CPC ...................................... G01J 9/00; G01J 9/02
USPC ........................ 356/450, 512, 521; 250/201.9
See application file for complete search history.

(56) References Cited

U.S. PATENT DOCUMENTS

| 7,988,292 | B2 * | 8/2011 | Neal et al. | 351/221 |
| 2004/0208595 | A1 * | 10/2004 | Mok et al. | 398/128 |
| 2006/0193065 | A1 * | 8/2006 | Novak | 359/849 |

OTHER PUBLICATIONS

Wallace, J. Kent et al. "A Phase-shifting Zernike Wavefront Sensor for the Palomar P3K Adaptive Optics System". Adaptive Optics Systems III, Proc. of SPIE vol. 8447, Sep. 13, 2012, pp. 84472K-1-84472K-6.*
Bloemhof, E. E. et al. "Phase contrast techniques for wavefront sensing and calibration in adaptive optics". Proc. SPIE 5169, Astronomical Adaptive Optics Systems and Applications, Dec. 24, 2003.*
Mishra, Sanjay K. et al. "Differential modal Zernike wavefront sensor employing a computer-generated hologram: a proposal". Applied Optics, vol. 48, No. 33, Nov. 20, 2009, pp. 6458-6465.*
Wallace, J. Kent et al. "Phase-Shifting Zernike Interferometer Wavefront Sensor". Proc. SPIE 8126, Optical Manufacturing and Testing IX, 81260F, Aug. 21, 2011.*
Dicke, "Phase-Contrast Detection of Telescope Seeing Errors and Their Correction", The Astrophysical Journal, Jun. 15, 1975, vol. 198, pp. 605-615.
Zernike, "How I Discovered Phase Contrast", Science, Mar. 11, 1955, pp. 345-349.
Zernike, "Phase Contrast, A New Method for the Microcopic Observation of Transparent Objects", Physica IX, No. 7. Jul. 1942, pp. 686-698.
Zernike, "Phase contrast, A New Method for the Microscopic Observation of Transparent Objects", Physica IX, No. 10, Dec. 1942, pp. 974-986.

* cited by examiner

*Primary Examiner* — Michael A Lyons
(74) *Attorney, Agent, or Firm* — KPPB LLP

(57) ABSTRACT

Hybrid sensors comprising Shack-Hartmann Wavefront Sensor (S-HWFS) and Zernike Wavefront Sensor (Z-WFS) capabilities are presented. The hybrid sensor includes a Z-WFS optically arranged in-line with a S-HWFS such that the combined wavefront sensor operates across a wide dynamic range and noise conditions. The Z-WFS may include the ability to introduce a dynamic phase shift in both transmissive and reflective modes.

13 Claims, 23 Drawing Sheets

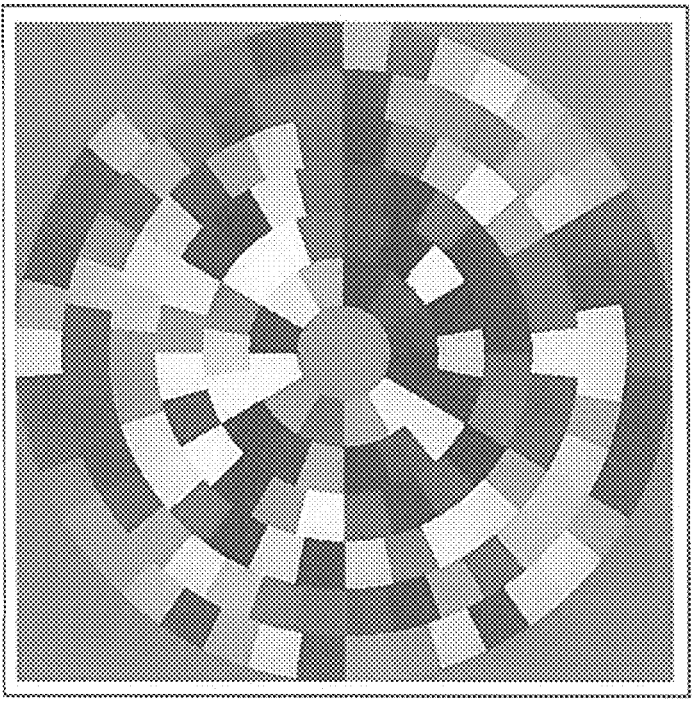
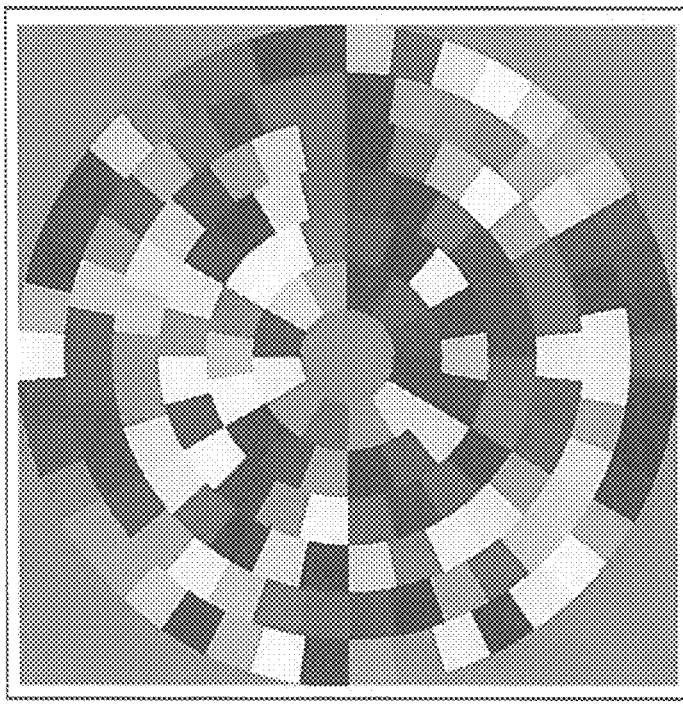
FIG. 2c

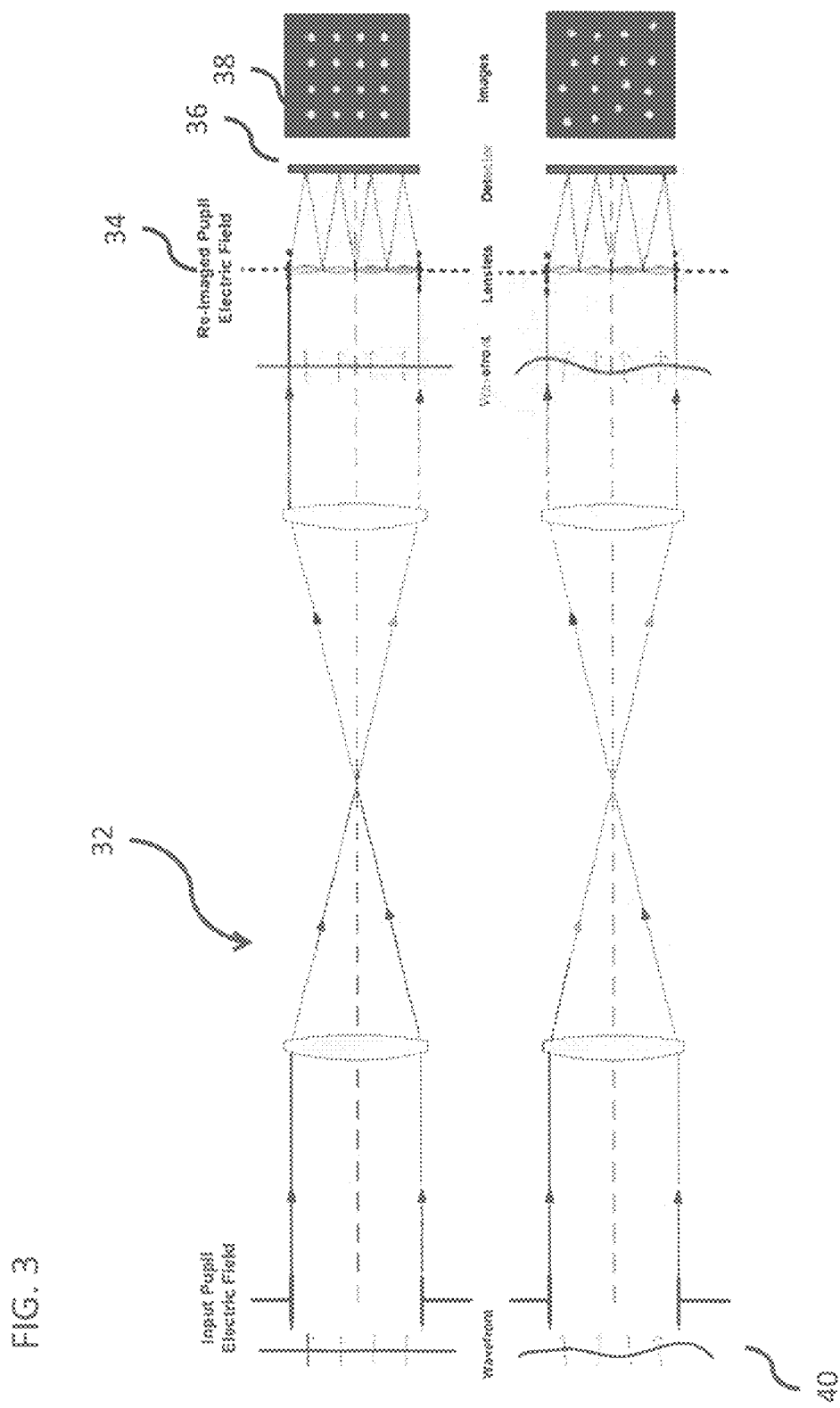

FIG. 4
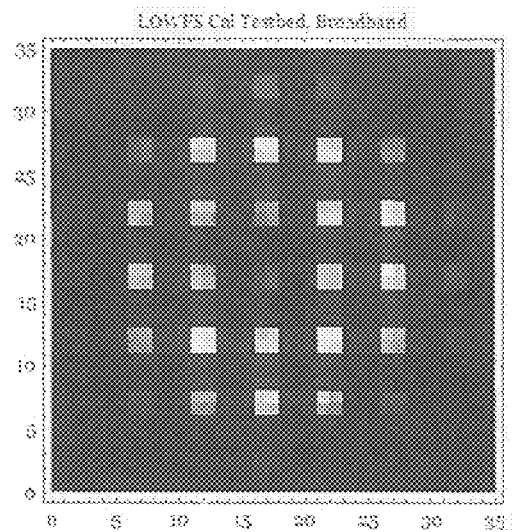
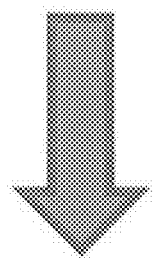
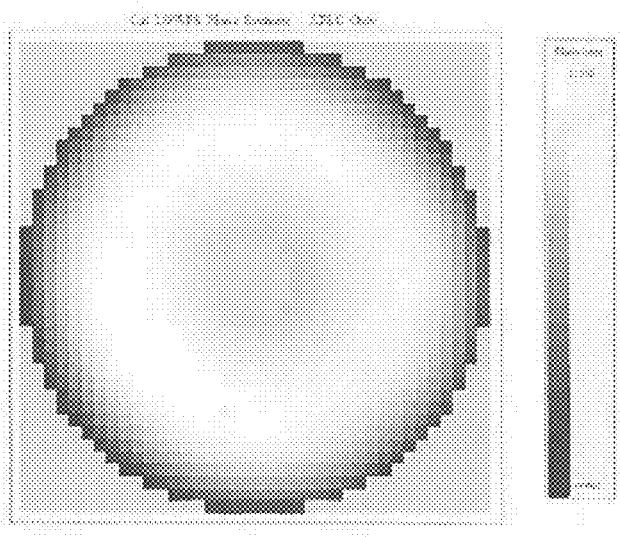

Imaging Viewing Mode

Pupil Viewing Mode

BROADBAND, COMMON-PATH, INTERFEROMETRIC WAVEFRONT SENSOR

CROSS-REFERENCE TO RELATED APPLICATION

The present application claims priority to U.S. Provisional Application No. 61/434,285, filed Jan. 20, 2012.

STATEMENT OF FEDERAL FUNDING

The invention described herein was made in the performance of work under a NASA contract, and is subject to the provisions of Public Law 96-517 (35 USC 202) in which the Contractor has elected to retain title.

FIELD OF THE INVENTION

The present invention generally relates to interferometric wavefront sensors for use in any phase measuring system; and more particularly to a common-path Zernike modified Shack-Hartmann wavefront sensor having in some embodiments particular application to adaptive optics.

BACKGROUND

Adaptive optics (AO) is a revolutionary method of imaging that has been used extensively in astronomy. In such an application, for example, the blurriness of the Earth's atmosphere may be removed from starlight leading to incredible increases in resolution and sensitivity of astronomical objects. These systems have been operational at astronomical observatories now for roughly twenty years. However, these systems are currently limited by their ability to accurately measure the distortion imparted to the starlight by the atmosphere. An improved ability to sense these errors would lead to a commensurate improvement in final image sharpness. Greater sharpness leads directly to a larger discovery space for science targets.

The typical wavefront sensor for most AO systems is the Shack-Hartmann Wavefront Sensor (S-HWFS). This sensor works by dicing the light coming from a telescope into little pieces, measuring the tip/tilt aberration on each piece with a few pixels for each little piece. These few pixels are called quad-cells. When all these measurements are made, they're all stitched back together to give the full measurement. This measurement of the wavefront error is then applied to the deformable mirror in the system for correction. This sensor has been the workhorse of AO systems for more than two decades.

However, in those twenty or so years, scientific discoveries and telescope architectures have changed, thereby revealing the shortcomings of this sensor. The S-HWFS is susceptible to noise for very low order aberrations (like tip/tilt/focus). This is because for these low-order modes, many of the quad-cells measure the same signal. The additional measurements from the independent quad-cells don't improve the signal but rather add noise. Also, newer telescope architectures use segmented apertures, akin to tiles in a mosaic. Creating a large telescope from individual tiles is less risky than building a single large mirror. However, a large, tiled mirror can only behave as a single, monolithic mirror if the individual segments are properly aligned.

Another wavefront sensor that has been developed, and that can address both of these concerns is the Zernike wavefront sensor (Z-WFS). The classic Z-WFS works by taking light that is at the very center of a star image, delaying or advancing it a little bit (this is done statically, with a phase plate), and then re-imaging the light at the telescope primary mirror (or pupil) location. The classic Z-WFS has been demonstrated to be far less susceptible to noise compared to the S-HWFS for the loworder modes like tip/tilt and focus. Also, because it works using the principle of optical coherence, it can also be used to measure the relative alignment of tiled (or segmented) apertures. Unfortunately, it has a limited working dynamic range. That is, it works best when the atmospheric correction is good enough to form a sharp image of a star.

Accordingly, a need exists to develop a wavefront sensor that overcomes the fundamental deficiencies of these conventional systems.

SUMMARY OF THE INVENTION

Embodiments of the current invention are directed to wavefront sensors for use in phase measuring systems.

In some embodiments, the invention is directed to hybrid wavefront sensors including:
- a Shack-Hartmann wavefront sensor having a SH-input pupil and a re-imaged SH-output pupil comprising at its distal end a lenslet array for dicing an incident image wavefront into separate segments;
- a Zernike wavefront sensor having a Z-input pupil and a Z-output pupil, the Zernike wavefront sensor being capable of dynamically shifting the phase of a portion of the image wavefront having a diameter on the order of $\lambda/D$, where D is the SH-input pupil diameter;
- a relay optical system disposed proximal to the lenslet array and designed such that the image wavefront from the SH-input pupil is relayed one-to-one to the Z-input pupil and the Z-output pupil is relayed one-to-one to the lenslet array of the SH-output pupil;
- a detector in optical alignment with the distal side of the lenslet array for imaging the incident image wavefront; and
- an electronic controller in signal communication between the Zernike wavefront sensor and the detector for correlating the phase shift imposed on the imaged wavefront.

In some such embodiments the optical path of the wavefront sensor is arranged such that the Zernike wavefront sensor may be bypassed.

In other such embodiments, the phase shift may be dynamically adjusted over a range of from $+\lambda/2$ and $-\lambda/2$.

In still other such embodiments, the relay optical system includes a parabolic mirror.

In yet other such embodiments, the Zernike wavefront sensor is transmissive. In some such embodiments, the Zernike wavefront sensor comprises a plurality of transmissive phase plates movable into and out of the optical path of the Zernike wavefront sensor, each of said transmissive plates capable of producing a different phase shift in the image wavefront.

In still yet other such embodiments, the Zernike wavefront sensor is one of either reflective or refractive. In some such embodiment, the Zernike wavefront sensor includes a reflective mechanical capillary device.

In still yet other such embodiments, the relay optical system comprises both a parabolic and elliptical reflector, and wherein the optical path of the sensor is switchable therebetween.

In still yet other such embodiments, the relay optical system includes a refractive element.

In other embodiments the invention is directed to reflective mechanical capillary optic device includes:

a ceramic ferrule or glass capillary defining a central longitudinal hollow passage and having a reflective end; and a glass fiber or filament having a reflective end, said fiber being positioned within the central hollow passage and movable therein such that the reflective end of the fiber can be offset relative to the horizontal plane of the reflective end of the ceramic ferrule or glass capillary.

In some such embodiments, the optic device further includes a piezoelectric transducer mechanically coupled to the fiber and disposed to translate said fiber within said ferrule.

In other such embodiments, the optic device further includes a quad cell detector to determine the position of the image wavefront with respect to the reflective mechanical capillary device.

In still other embodiments, the invention is directed to a dynamic reflective Zernike wavefront sensor including:
a body defining a central longitudinal hollow passage and having a reflective end; and a glass fiber or glass filament having a reflective end, said fiber being positioned within the central hollow passage and movable therein such that the reflective end of the fiber can be offset relative to the horizontal plane of the reflective end of the ceramic ferrule over a range of from $+\lambda/2$ and $-\lambda/2$.

In some such embodiments, the fiber has a diameter on the order of $\lambda/D$, where D is the SH-input pupil diameter.

In other such embodiments, the sensor further includes a piezoelectric transducer mechanically coupled to the fiber and disposed to translate said fiber within said ferrule.

In still other such embodiments, the sensor further includes a quad cell detector to determine the position of the image wavefront with respect to the reflective mechanical capillary device.

In yet other such embodiments, the reflective ends of the body and the fiber are coated with reflective material.

In still yet other such embodiments, the body is a ceramic ferrule or glass capillary.

In still yet other such embodiments, the fiber is a glass filament.

In yet other such embodiments, the invention is directed to a method of imaging an image wavefront including:
passing the image wavefront through a Shack-Hartmann wavefront sensor;

relaying the image wavefront to a Zernike wavefront sensor prior to dicing the image wavefront into segments;

phase shifting at least a portion of the image wavefront in the Zernike wavefront sensor;

returning the image wavefront to the Shack-Hartmann wavefront sensor and dicing the image phase shifted wavefront into segments; and imaging the diced and phase shifted image wavefront.

In some such embodiments, the phase shifting may be discontinued.

BRIEF DESCRIPTION OF THE DRAWINGS

The description will be more fully understood with reference to the following figures and data, which are presented as exemplary embodiments of the invention and should not be construed as a complete recitation of the scope of the invention, wherein:

FIG. 2c provides a numerical simulation for a measurement of segmented telescope aberrations taken with an embodiment of a wavefront sensor in accordance with the invention.

FIG. 3 provides a schematic diagram of the optical layout of a conventional Shack-Hartmann wavefront sensor.

FIG. 4 provides an image of a wavefront measurement taken using a Shack-Hartmann wavefront sensor.

DETAILED DESCRIPTION OF THE INVENTION

Hybrid sensors comprising Shack-Hartmann Wavefront Sensor (S-HWFS) and Zernike Wavefront Sensor (Z-WFS) capabilities are presented in this disclosure. In some embodiments, the hybrid sensor includes a Z-WFS optically arranged in-line or in parallel with a S-HWFS such that the combined wavefront sensor operates across a wide dynamic range and noise conditions. In other embodiments the Z-WFS includes the ability to introduce a dynamic phase shift in both transmissive and reflective modes.

Figure 1:
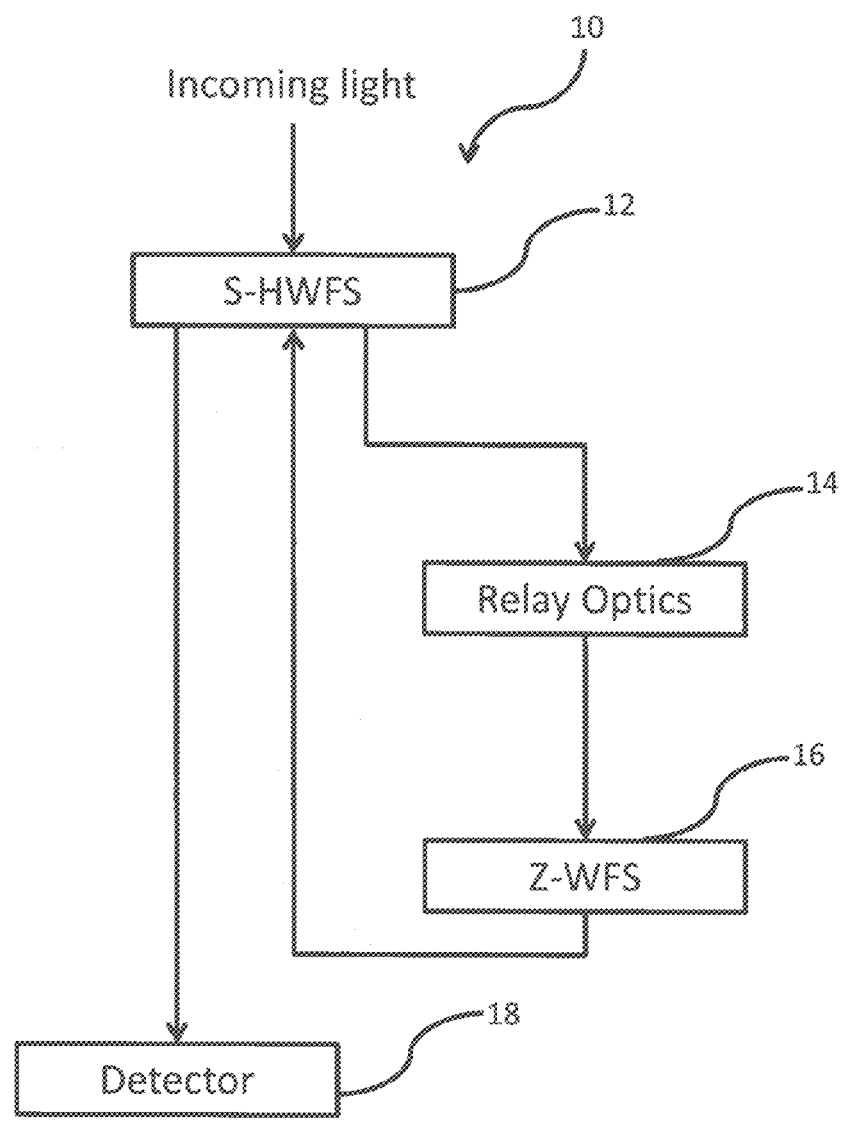
FIG. 1 provides a schematic block diagram of a hybrid wavefront sensor in accordance with embodiments of the current invention.

Turning to the figures and data plots, as shown in FIG. 1, in some embodiments the hybrid wavefront sensor (10) includes a conventional S-HWFS (12) placed in optical alignment through a relay optic (14) with a dynamically phase shiftable Z-WFS (16), that, in turn, is place into optical alignment with a suitable optical detector (18). By allowing for the placement of the dynamic Z-WFS in-line or in parallel with the conventional S-HWFS, the hybrid wavefront sensor can be used with no change in the traditional operational modes of these sensors. Moreover, in this configuration the Z-WFS can be turned on or off as needed to provide an extra boost in sensitivity and as well as an increase in the sensing speed.

Hybrid Wavefront Sensor Architecture

The benefits of this dynamic phase modulation are evident, and other types of wavefront sensors based upon this technique have been developed. However, implementation of the phase shifting has resulted in systems that are not simple to fabricate, and are wavelength and/or polarization sensitive.

Figure 2A:
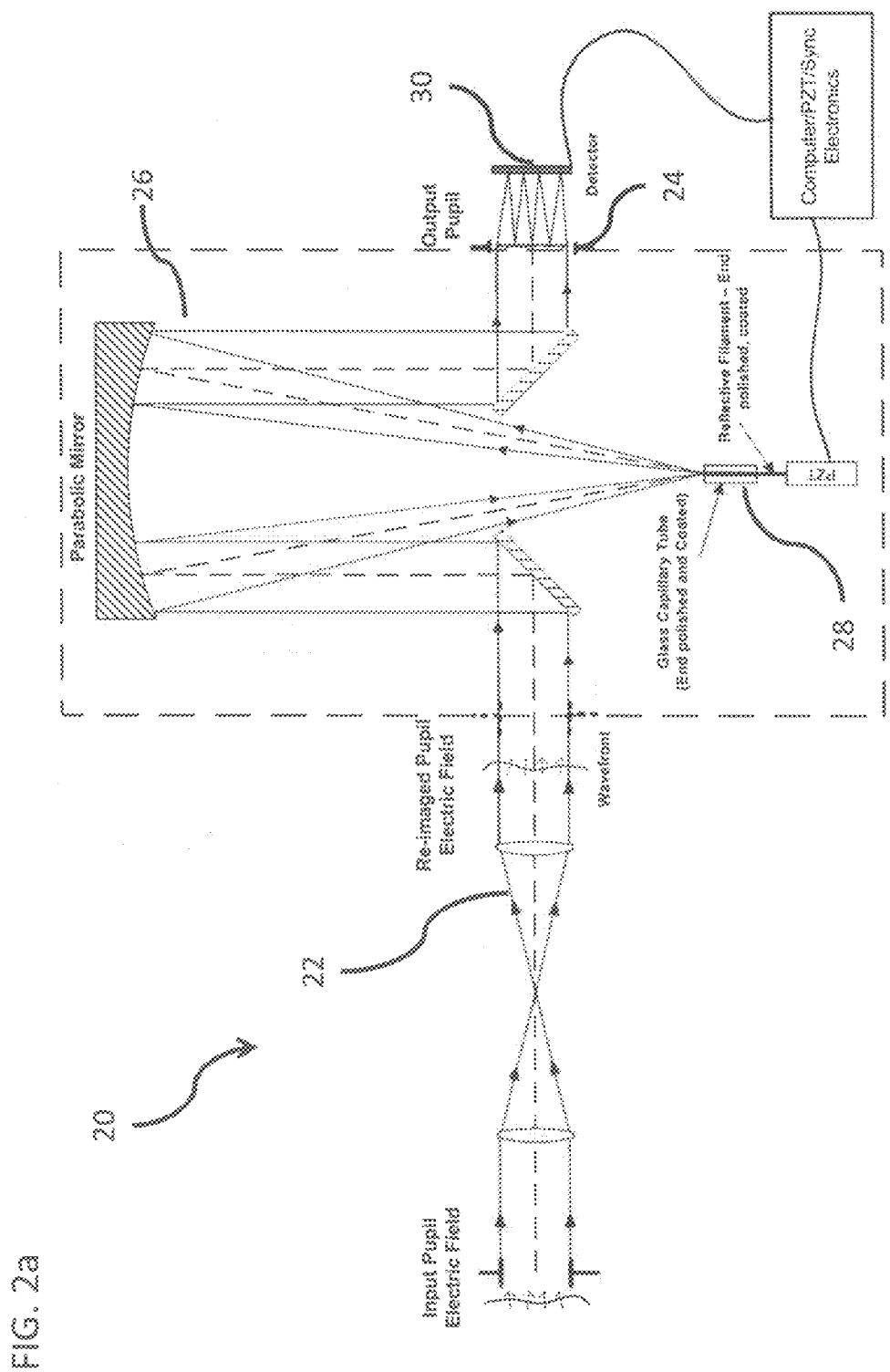
FIG. 2a provides a schematic diagram of a hybrid Shack-Hartmann wavefront sensor in-line with a reflective dynamic Zernike wavefront sensor in accordance with embodiments of the current invention.
Figure 2B:
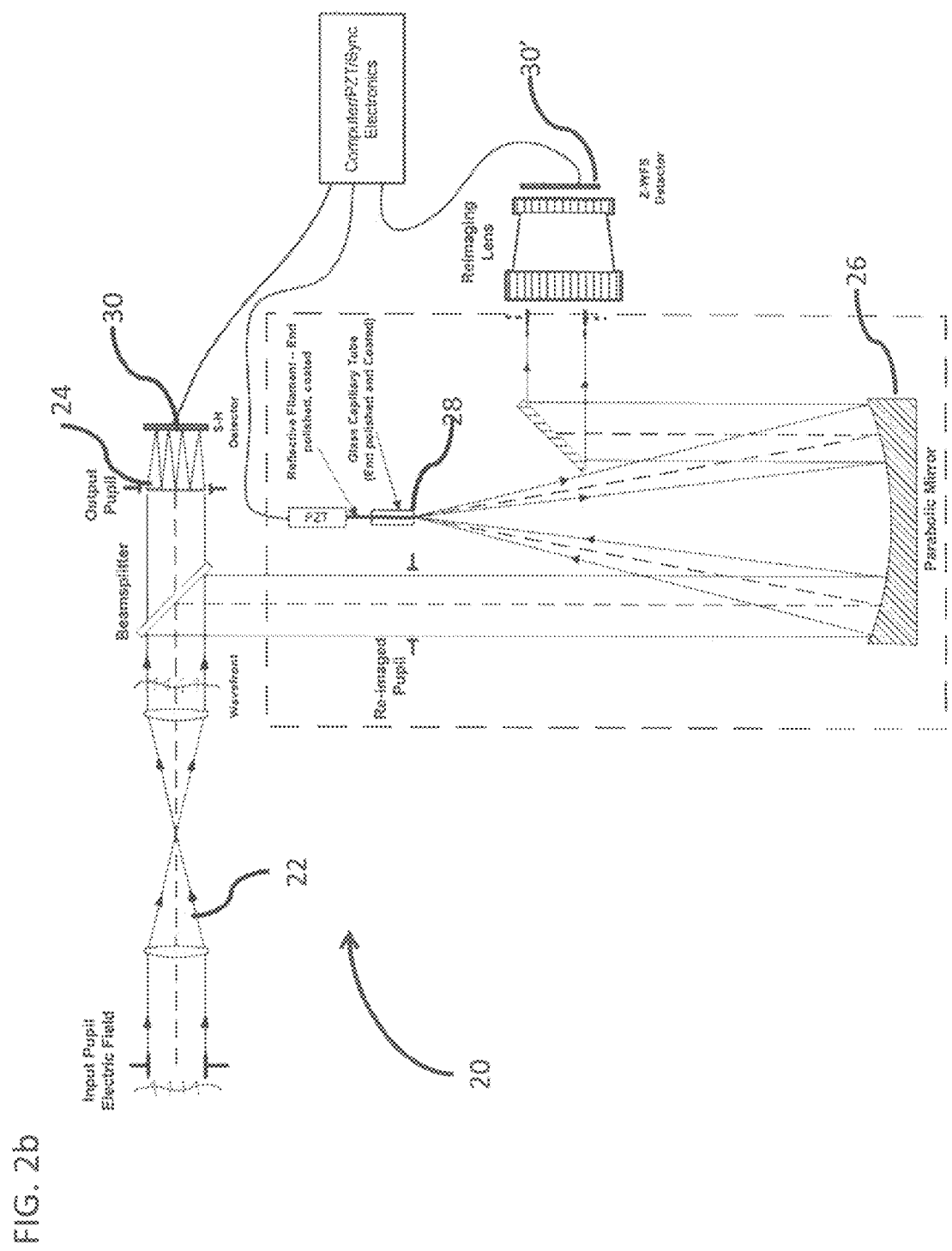
FIG. 2b provides a schematic diagram of a hybrid Shack-Hartmann wavefront sensor in parallel with a reflective dynamic Zernike wavefront sensor in accordance with embodiments of the current invention.

Here a high-level overview of embodiments of the components of a dynamic and broadband hybrid wavefront sensor are provided. As is shown in FIG. 2a, in some embodiments the hybrid wavefront sensor (20) comprises a Shack-Hartmann wavefront sensor (22), however, at the location where the pupil is imaged and diced into separate segments with a lenslet array (24), an optical relay system (26) is inserted. The relay optical system performs a one-to-one image relay having a Zernike optic (28) at its focus. Once transmitted past this Zernike optic the pupil image is returned to the lenslet array, after which it is detected by a suitable optical detector (30). Shown in FIG. 2b, in some alternative embodiments the hybrid wavefront sensor consists of a Shack-Hartmann wavefront sensor (22) in parallel with a Zernike wavefront sensor (28). The major modification here is the need for separate sensors (30 & 30') for the S_HWFS and the Z-WFS. In such an arrangement, these two separate systems can be run simultaneously at all times. FIG. 2c shows a measurement of alignment errors for a segmented telescope using such a system.

Shack-Hartmann Wavefront Sensor

The Shack-Hartmann (or Hartmann-Shack) wavefront sensor (32) is an optical instrument used to characterize an imaging system. It is a wavefront sensor commonly used in adaptive optics systems. As shown in FIG. 3, the wavefront sensor (32) consists of an array of lenses (34)(called lenslets) of the same focal length positioned distal to a reimaged pupil. Each of these lenslets is focused onto a photon sensor (36) (typically a CCD array or quad-cell). In operation, the local tilt of the wavefront across each lens is calculated from the position of the focal spot (38) on the sensor. Any phase aberration can then be approximated to a set of discrete tilts. By sampling an array of lenslets all of these tilts can be measured and the whole wavefront (40) approximated thereby resulting in improved resolution. The limits to such a wavefront sensor are that only tilts are measured so that the sensor cannot detect discontinuous steps in the wavefront. In addition, the calculations required to approximate the aberrations are extremely complex.

Zernike Wavefront Sensor

In turn, the Zernike wavefront sensor (42) in its basic form is a device that consists of the addition of an optical element which produces a phase shift to the central core of point-spread function (PSF). The device is based on the phase-contrast method developed by Fritz Zernike. Zernike's original concept was to induce a static phase shift ($\lambda/4$ or $-\lambda/4$) at the core of a point-spread function intermediate between the input pupil plane and the output pupil plane. This static phase shift has the effect of transforming a phase error in the input pupil into an intensity signal in the output pupil. This simple optical element makes it possible to image phase objects which are otherwise transparent (like biological specimen, for instance). Further, it makes visible phase errors which would otherwise be invisible.

Figure 5:
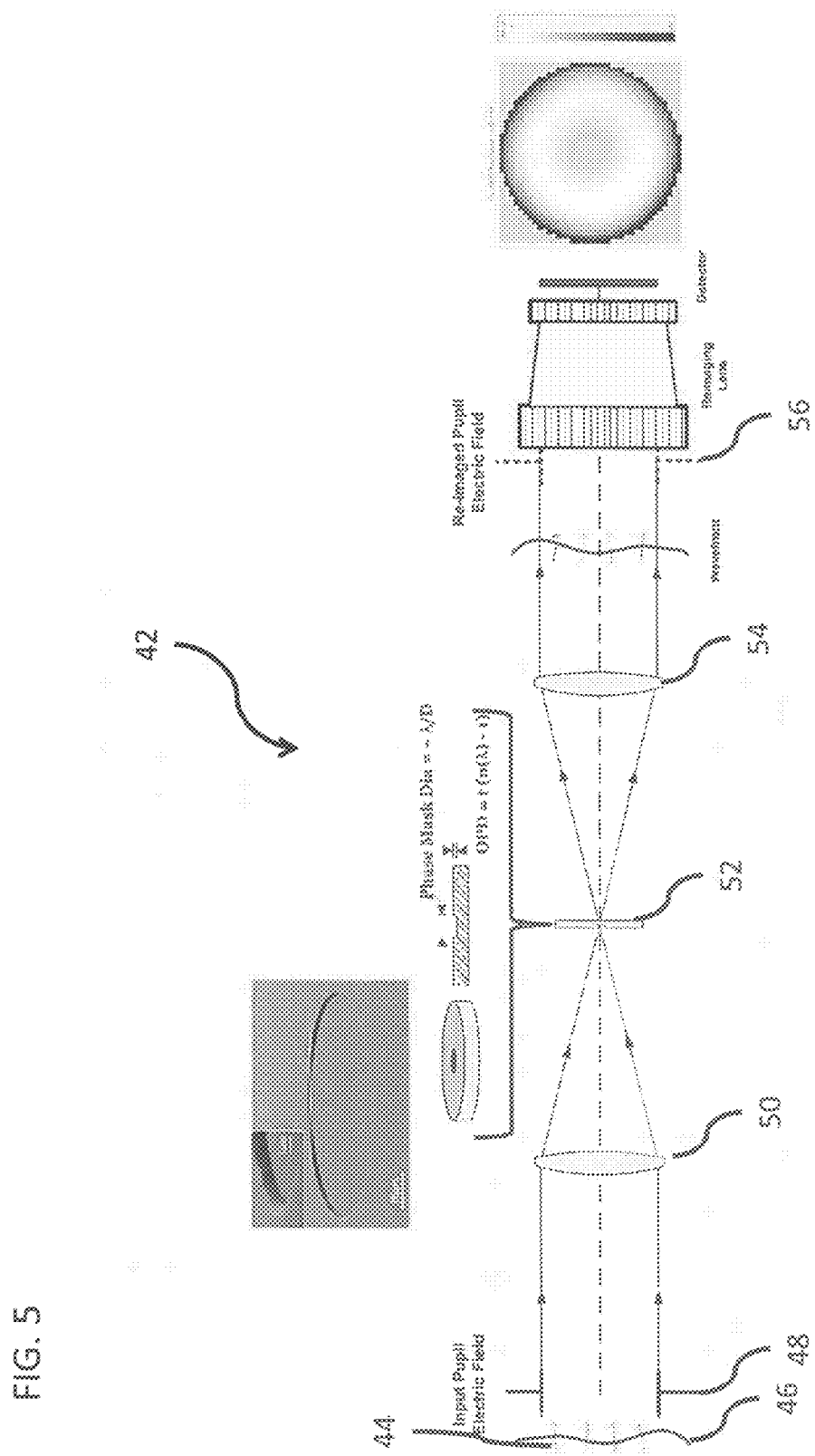
FIG. 5 provides a schematic diagram of the optical layout of a canonical optical system in combination with a static Zernike phase-contrast.

The canonical Zernike optical system is illustrated in FIG. 5. As shown, light enters the system on the left (44) of the diagram and passes through a screen of spatially varying transmission and phase (46) that is immediately before the input pupil (48). This field is subsequently focused by a lens (50) to form a point spread function (PSF) in the image plane. An optical element (52) with a phase delay of $\lambda/4$ within a diameter of a few $\lambda/D$ is centered on this PSF. After passing through the focal plane element (54), the light continues to propagate to the output pupil (56) where the optical intensity is measured. The electric field immediately before the input is given by:

$$E(\mu,v)=P(\mu,v)\cdot A(1+\epsilon(\mu,v))e^{-i\phi(\mu,v)} \quad (1)$$

Here, the pupil function is given by $P(\mu, v)$, the mean electric field amplitude is A, the point-by-point variation in the electric field strength is given by $\epsilon(\mu, v)$. The pupil-dependent phase is given by $\phi(\mu, v)$. For simplicity sake, an assumption is made that the phase in the input pupil is small, compared to a radian. With this assumption the expression for the electric field then becomes:

$$E(\mu,v)=P(\mu,v)\cdot A(1+\epsilon(\mu,v)+i\phi(\mu,v)) \quad (2)$$

Here, the second order terms have been dropped. This field is propagated to the focal plane of the system by a Fourier transform. This Fourier transform operator is shown schematically as $\mathcal{F}$:

$$E(\eta,v)=A\,\mathrm{PSF}(\eta,v)+A\,\mathrm{PSF}(\eta,v)*\mathcal{F}\,[\epsilon(\mu,v)+i\phi(\mu,v)] \quad (3)$$

where the Cartesian coordinates in the image plane are represented by $\eta$, $v$ and the convolution operation is represented by the * symbol. The Fourier transform of the pupil function is represented by PSF. The electric field in the image plane is therefore given by the sum to two terms, the first is the PSF of the system with a perfect input field (no phase or amplitude errors). The second term is given by the convolution of this PSF with the Fourier transform of the phase and amplitude errors of the input beam.

Next, a phase shift is applied to the PSF portion of the image plane electric field. In theory, the PSF has infinite extent, so applying a uniform phase-shift to this part of the full extended field appears problematic. However, in practice, most of the energy of the PSF is located in a very compact area. For typical systems, ~85% of the energy lies with a diameter of ~2 λ/D where λ is the wavelength of operation and D is the input pupil diameter. Again for simplicity's sake, we will mathematically apply a uniform phase shift to the PSF. In numerical simulations we quantify the error in this assumption (but rest assured, it's a small effect). The magnitude of the phase shift is given by θ, $$E(n,v)=A\ \text{PSF}(n,v)e^{i\theta}+A\ \text{PSF}(n,v)^* \mathcal{F}\ [\epsilon(\mu,v)+i\phi(\mu,v)] \quad (4)$$

Sensing will be done in the pupil plane, so a subsequent Fourier transform is needed to quantify the response in this plane. The Cartesian coordinates are represented by (x, y) in the re-imaged plane according to:

$$E(x,y)=A\ P(x,y)\cdot[(e^{i\theta}+\epsilon(x,y)+i\phi(x,y)] \quad (5)$$

The electric field from the original input pupil has been modified in the re-imaged output pupil in following way: the DC part of the electric field has been replaced by its phase-shifted version. This phase shift is nearly uniform across the re-imaged pupil plane. For the sake of brevity, in the next few set of equations the explicit coordinates will be dropped. Likewise, the pupil function will be implied and its explicit notation also dropped. With a static phase shift of +λ/4 (θ=π/2), the electric field and intensity at the output pupil plane are:

$$E = A\left(e^{i\frac{\pi}{2}} + \varepsilon + i\varphi\right) = A(-i + \varepsilon + i\varphi) \quad (6)$$
$$I = E \cdot E^* = A^2(1 + 2\varphi + \varepsilon^2 + \varphi^2)$$

The intensity in the pupil image given by equation x above can be characterized as a pedestal that is the mean intensity at the input pupil but modulated by the addition of a few terms. The first term is proportional to twice the phase at that location in the input pupil. The final two terms are proportional to the square of the amplitude and phase errors. With the assumption that φ<1, then φ²<<φ and can be ignored. It is also typically assumed that transmission variability, ϵ, is small compare to phase variability and can likewise be ignored.

There are a few noteworthy benefits of the Zernike system to point out. First of these is its elegant simplicity. Any pupil viewing instrument that also has an accessible, intermediate focus can become a sensitive phase measuring device by the addition of the phase mask centered on the PSF. Second, the measurement is easily interpreted. Bright areas are phase bumps above the mean phase, and darker areas are phase troughs. Third, the sensor is common-mode in the sense that after the focal plane mask, the PSF core that has been phase shifted co-propagates with the other parts of the original electric field. After the focal plane mask, the measurement is less affected by phase errors like air turbulence or optical fabrication errors because these affect both co-propagating beams in nearly the same way. Fourth, the sampling if easily changed with the addition of a zoom lens between the pupil and final image plane. Under certain circumstances, it may be beneficial to sample the phase with greater resolution, at the expense of more noise. Fifth, for adaptive optics system that require a phase estimate at high speed, deformable mirror elements and pupil pixel elements can be mapped one-to-one for optimum noise performance. The reconstruction algorithm is extremely simple to implement and can be done on a pixel-by-pixel basis.

However, despite its advantages there are some limitations to the above-described conventional static phase offset. Given that it is fundamentally an intensity measurement, any system error that results in a detector signal variation that is not due to phase, will lead to a corresponding incorrect phase estimation. For example, a variation in detector dark current results in signal variation that could be misinterpreted as phase. Likewise, amplitude fluctuations (like atmospheric scintillation) can create spurious signals (albeit as a second order effect). It has now been determined that many of the detection limitations described above can be removed by introducing a time varying modulation into the phase shift of the Zernike sensor. Modulation of the phase shift will, of necessity, create a temporal modulation in the intensity measurement. Demodulation of these intensity measurements results in: 1) a direct measurement of the phase and 2) rejection of many systematic error terms listed above.

Consider electric fields and corresponding intensities in the output pupil plane for four different phase steps from −λ/2 to +λ/2 in steps of +λ/4 (θ=−π/2, 0, π/2, π).

$$E_1 = A\left(e^{-i\frac{\pi}{2}} + \varepsilon + i\varphi\right) = A(-i + \varepsilon + i\varphi) \quad (7)$$
$$E_2 = A(e^{-i0} + \varepsilon + i\varphi) = A(-i + \varepsilon + i\varphi)$$
$$E_3 = A\left(e^{i\frac{\pi}{2}} + \varepsilon + i\varphi\right) = A(-i + \varepsilon + i\varphi)$$
$$E_4 = A(e^{-i\pi} + \varepsilon + i\varphi) = A(-i + \varepsilon + i\varphi)$$

The intensity measurements are then:

$$I_1=E_1\cdot E_1^*=A^2(1+\epsilon^2+2\phi+\phi^2)$$
$$I_2=E_2\cdot E_2^*=A^2(1+\epsilon^2+2\epsilon+\phi^2)$$
$$I_1=E_1\cdot E_1^*=A^2(1+\epsilon^2-2\phi+\phi^2)$$
$$I_1=E_1\cdot E_1^*=A^2(1+\epsilon^2-2\epsilon+\phi^2) \quad (8)$$

From these four intensity measurements, the pupil dependent phase and amplitude errors of the electric field the input pupil can be estimated.

$$\varphi = \frac{I_1 - I_3}{4A^2} \quad (9)$$

$$\varepsilon = \frac{I_2 - I_4}{4A^2} \quad (10)$$

Therefore, a simple difference in the intensity images taken when the phase step is −π/2 and π/2 provides an estimate of the phase, and similarly the difference images at 0 and π provide the estimate for amplitude errors (both up to second order).

The introduction of a dynamic phase shift to the nominal PSF gives this sensor a unique advantage over those sensors that use a static phase shift. It allows the reference beam electric field to be modulated at a unique, selectable frequency. The resulting intensity measurements are also modulated at this frequency, and the demodulation process will reject noise that is not at the frequency of the intensity modulation. Phase modulation also rejects those intensity signals that are incoherent with the reference light. For instance, intensities that might arise due to background illumination (static or dynamic) or light scattered internal to the sensor will also be rejected.

Accordingly, in some embodiments of the invention, the Z-WFS of the system is of a design that allows for the insertion of a phase step at the core of the PSF that is adaptive and variable such that it can be made to switch between +λ/2 and −λ/2 in short order into the imaging beam. It should be understood that such a dynamic Z-WFS can take any suitable form capable of implementing such an adaptive and variable phase step into the imaging beam. Examples of transmissive, refractive and reflective embodiments of suitable Z-WFS devices are described in the Exemplary Embodiments, below.

Likewise, although specific embodiments of relay optics and optical detectors have been described above, it should be understood that any optical system suitable for: 1) inducing a dynamic phase shift to the core of a PSF (either in transmission, reflection or refraction), 2) used to relay the subsequent pupil to an imaging array, and 3) used in combination, either in-line or in-parallel, with another wavefront sensor (such as S-H wavefront sensor) to form a hybrid wavefront sensor.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

Example 1

Zernike Phase Estimation

Figure 6:
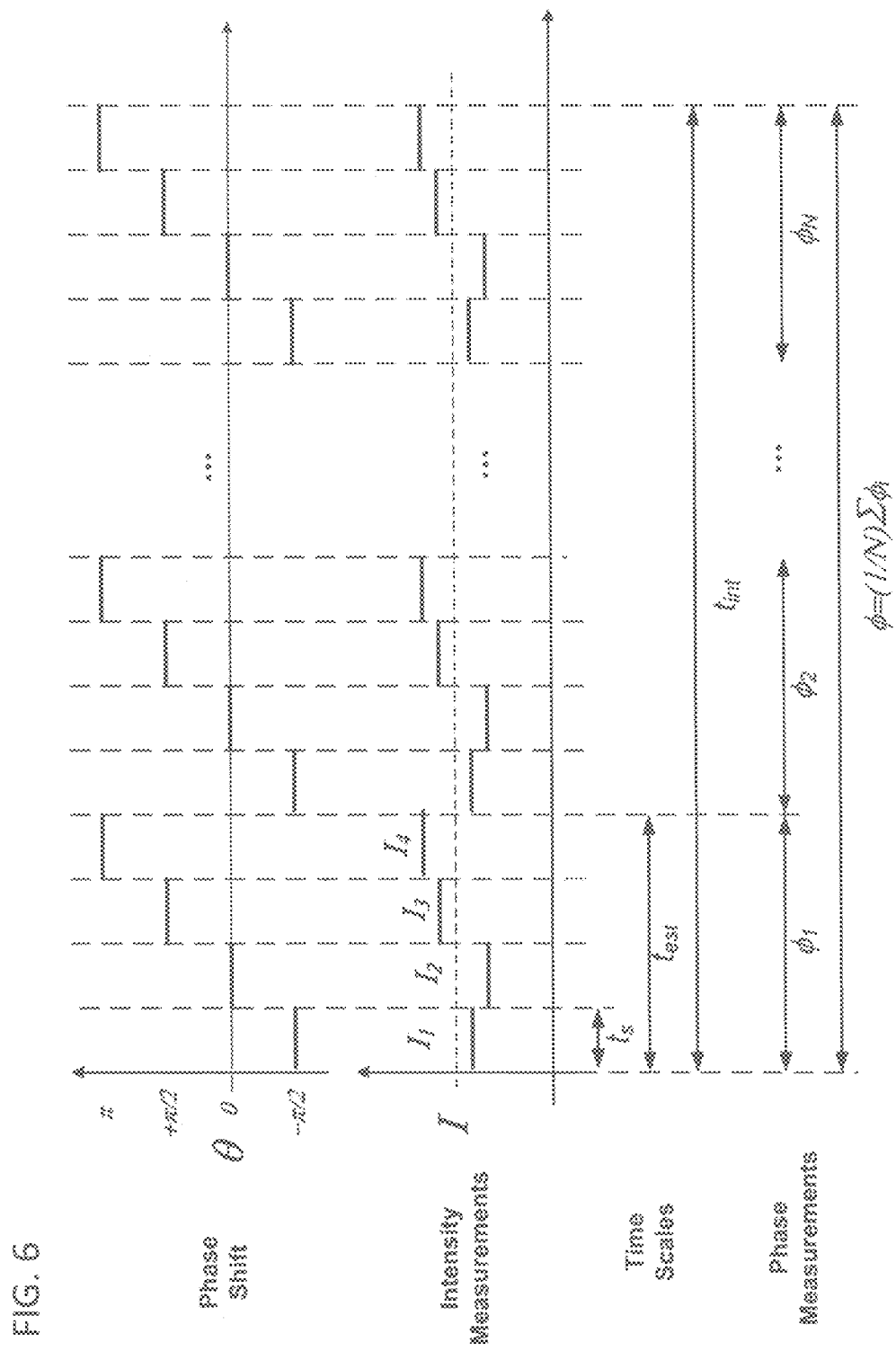
FIG. 6 provides a schematic of time phase timescales according to embodiments of the current invention.

In this example, the process of making a phase estimate in an integration period is demonstrated. There are several time scales to be aware of including: the sample period of the detector, $t_s$, the time required to make a single phase estimate, $t_{est}$, and the time over which multiple, independent estimates are made (called the integration period) $t_{int}$. These different timescales are illustrated in the time chart provided in FIG. 6.

From the N different estimates made during an integration time, it is possible to create an average phase estimate given by:

$$\varphi = \frac{1}{N} \sum_{i=1}^{N} \varphi_i \tag{11}$$

The error on the overall estimate, $\delta\phi$, can be computed from the individual estimate errors $\delta\phi_i$ in a straightforward way. Since $\phi$ is simply an average of individual estimates according to EQ. 11, the overall error is obtained by adding the individual errors in quadrature, $$\delta\varphi^2 = \left(\frac{\delta\varphi_1}{N}\right)^2 + \left(\frac{\delta\varphi_2}{N}\right)^2 + \ldots + \left(\frac{\delta\varphi_N}{N}\right)^2 = \frac{1}{N^2}(\delta\varphi_1^2 + \delta\varphi_2^2 + \ldots + \delta\varphi_N^2) \tag{12}$$

Note that the $\phi_i$ are independent measurements and there are N of them, so the equation simplifies to:

$$\delta\varphi^2 = \frac{\delta\varphi_i^2}{N} \tag{13}$$

$$\delta\varphi = \frac{\delta\varphi_i}{\sqrt{N}}$$

The following sections consider the errors that exist for a given individual phase measurement $\delta\phi_i$. Once this individual error has been determined, the error in the averaged estimate is obtained by simply dividing by root N. For convenience sake, the expression for the phase estimate is provided below.

$$\varphi = \frac{I_3 - I_1}{4I_0} \tag{14}$$

Because and $I_1$ and $I_3$ are the only quantities in (14) subject to noise sources, the estimation error due to these terms is:

$$\delta\varphi_i^2 = \left(\frac{\partial\varphi_i}{\partial I_3}\delta I_3\right)^2 + \left(\frac{\partial\varphi_i}{\partial I_1}\delta I_1\right)^2 \tag{15}$$

Taking the above derivatives results in:

$$\delta\varphi_i^2 = \left(\frac{1}{4I_0}\right)^2 (\delta I_1^2 + \delta I_3^2) \tag{16}$$

Writing the source photon noise and background photon noise as $\sigma_{photon,source}$ and $\sigma_{photon,background}$ respectively. These two sources sum in quadrature to give the noise for a single measurement:

$$\delta I_1^2 = \delta I_3^2 = \sigma_{photon,source}^2 + \sigma_{photon,background}^2 \tag{17}$$

Then the phase measurement error in radians is:

$$\delta\varphi_i = \left(\frac{1}{4I_o}\right)\sqrt{2}\sqrt{\sigma_{photon,source}^2 + \sigma_{photon,background}^2} \tag{18}$$

In nanometers this is given by:

$$\delta\varphi_i = \left(\frac{\lambda}{2\pi}\right)\left(\frac{1}{4I_o}\right)\sqrt{2}\sqrt{\sigma_{photon,source}^2 + \sigma_{photon,background}^2} \tag{19}$$

For this performance simulation, the properties of the atmospheric transmission, telescope primary, pupil sampling, wavelength and optical bandpass are assumed to take the values given in Table 1, below:

TABLE 1

Performance Simulation Parameters

| Property | Value |
|---|---|
| Atmospheric Transmission | 45% |
| Primary Diameter | 10 meters |
| Number of Pixel Samples Across Diameter | 32 |
| Mean Observing Wavelength | 850 μm |
| Optical Bandpass | 14% |
| Airy Disk (2.44 λ/D) | 43 arc sec |

For the astronomical sources of interest, Mars and Saturn are considered. Their key properties are listed in Table 2, below:

TABLE 2

Properties of Study Planets

| Property | Mars | Saturn |
|---|---|---|
| Blackbody Temperature at 850 μm | 210K | 81K |
| Angular Size (near/far) | 25.1/3.5 arc sec | 18.8/13.5 arc sec |

From these properties, it is possible to estimate the spectral radiance, band radiance, photon per sample (at the top of the atmosphere, and at the primary). These values are given in Table 3, below.

TABLE 3

Estimates of Planet Properties

| Property | Mars | Saturn |
|---|---|---|
| Spectral Radiance (photons/sec/m$^2$/m/steradian, top of atmosphere) | 1.37E+22 | 4.94E+21 |
| Band Radiance (photons/sec/m$^2$/steradian, at primary) | 1.63E+18 | 5.88E+17 |
| Photons Rate (photons/sec, at primary, primary pixel sample) | 8.31E+8 | 1.68E+8 |
| Occupation Number | 11.9 | 4.3 |
| Photons per 1 second sample per primary pixel sample (near/far) | 8.3E+8/1.6E+7 | 1.68E+8/8.72E+7 |
| Photon Noise, per 1 second sample, per primary pixel sample (near/far) | 3.57E+5/4.97E+4 | 6.19E+4/4.46E+4 |

Similarly the contribution from the sky for background photons and background photon noise is given in Table 4, below.

TABLE 4

Background Photon Effects

| Property | Value |
|---|---|
| Sky Temperature | 265K |
| Sky Emissivity | 55% |
| Size of cold field stop | 32 λ/D (22 arc min) |
| Sky solid angle per pupil (defined by field stop) | 3.46E−5 steradians |
| Rate | 2.54E+11 |
| BG Photons per one second sample | 3.85E+12 |
| BG Photon noise per one second sample | 3.07E+07 |

From the noise equations detailed above, it is possible to determine the noise in phase for each estimate (remember, one estimate comes after four intensity samples each one second long).

| | Mars (near/far) | Saturn (near/far) |
|---|---|---|
| Random error per phase estimate (μm, rms, per four seconds) | 1.77 μm/91 μm/rms | 16.84 μm/16.84 μm |

Because these estimates are based upon random noise sources, they will go down as Sqrt[N], where N is the number of un-correlated estimates.

Example 2

Transmissive Zernike Wavefront Sensor Architecture

Figure 7:
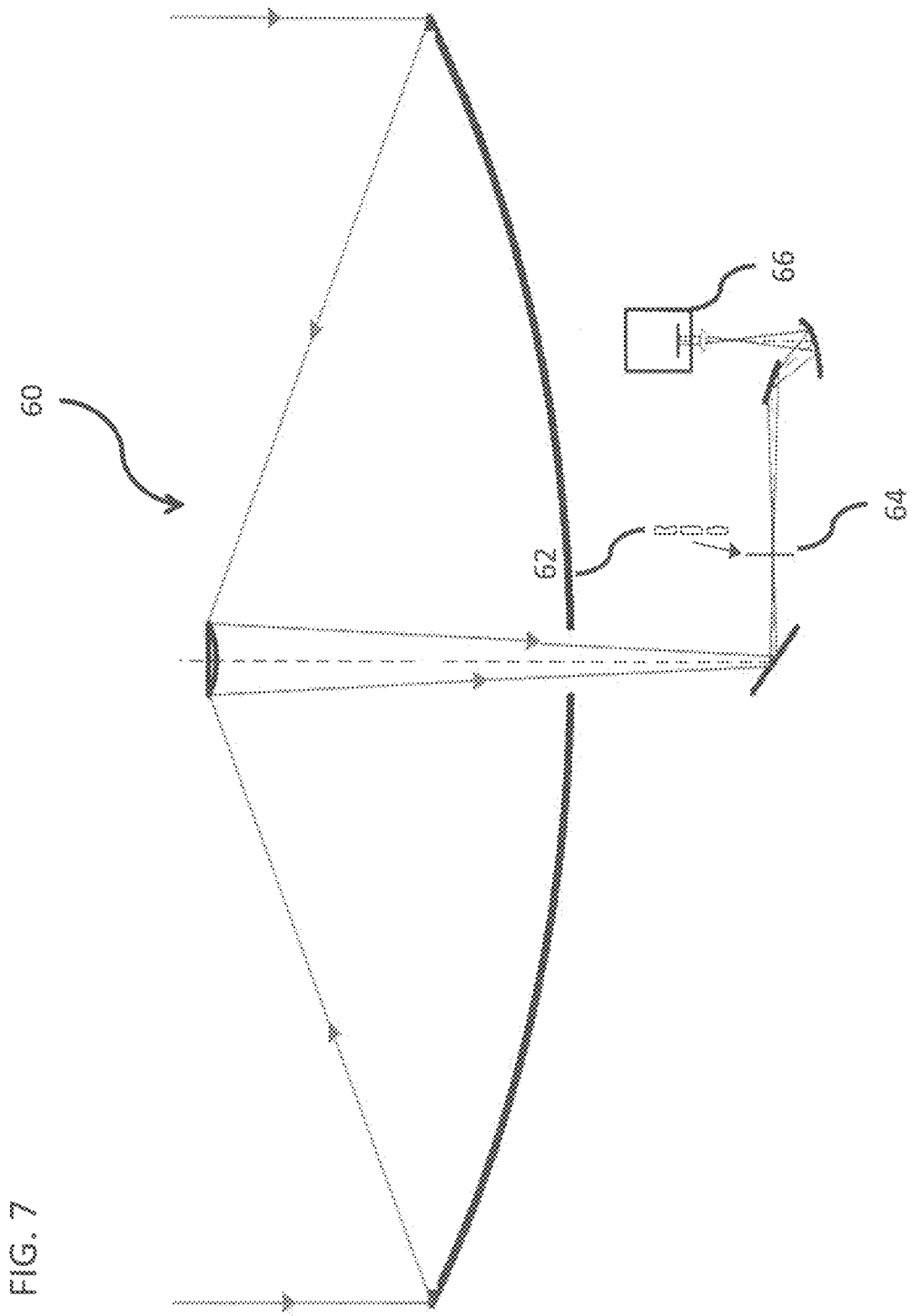
FIG. 7 provides a schematic diagram of a transmissive dynamic Zernicke wavefront sensor in accordance with embodiments of the current invention.

In one example a dynamic transmissive Zernike device has been implemented in a telescope (60). The primary advantage of such a transmissive implementation is that it minimizes the impact on the routine operation of the telescope. In practice, this involves two design decisions: 1) the dynamic phase-contrast is implemented with phase plates (62) installed at the telescope focal plane (64) in rapid succession, and 2) the pupil is relayed to the detector array (66) with a transmissive lens relay. This is shown schematically in FIG. 7.

Figure 8:
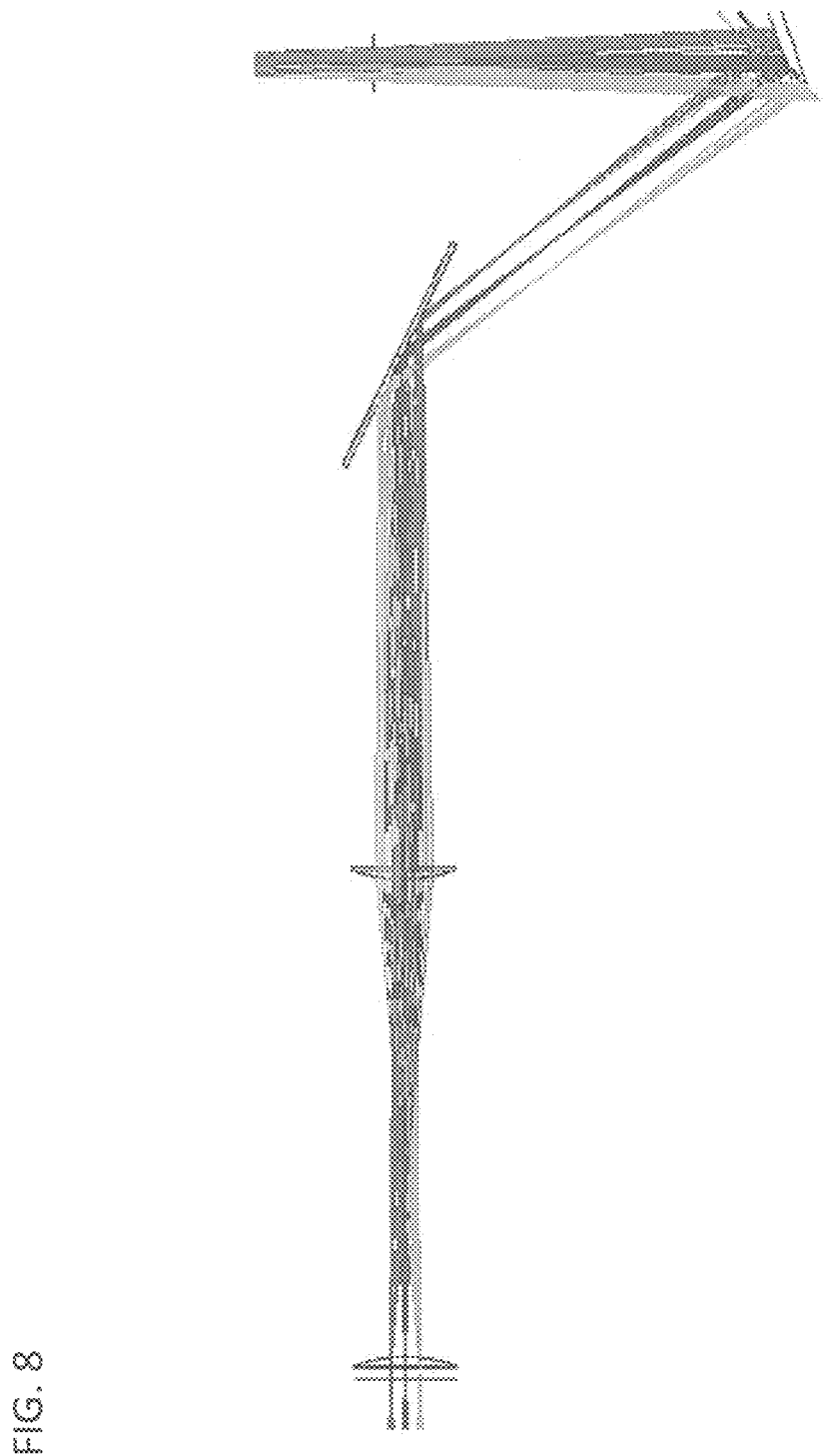
FIG. 8 provides a schematic ray diagram of the pupil imaging relay for a transmissive dynamic Zernike wavefront sensor of FIG. 7.
Figure 9:
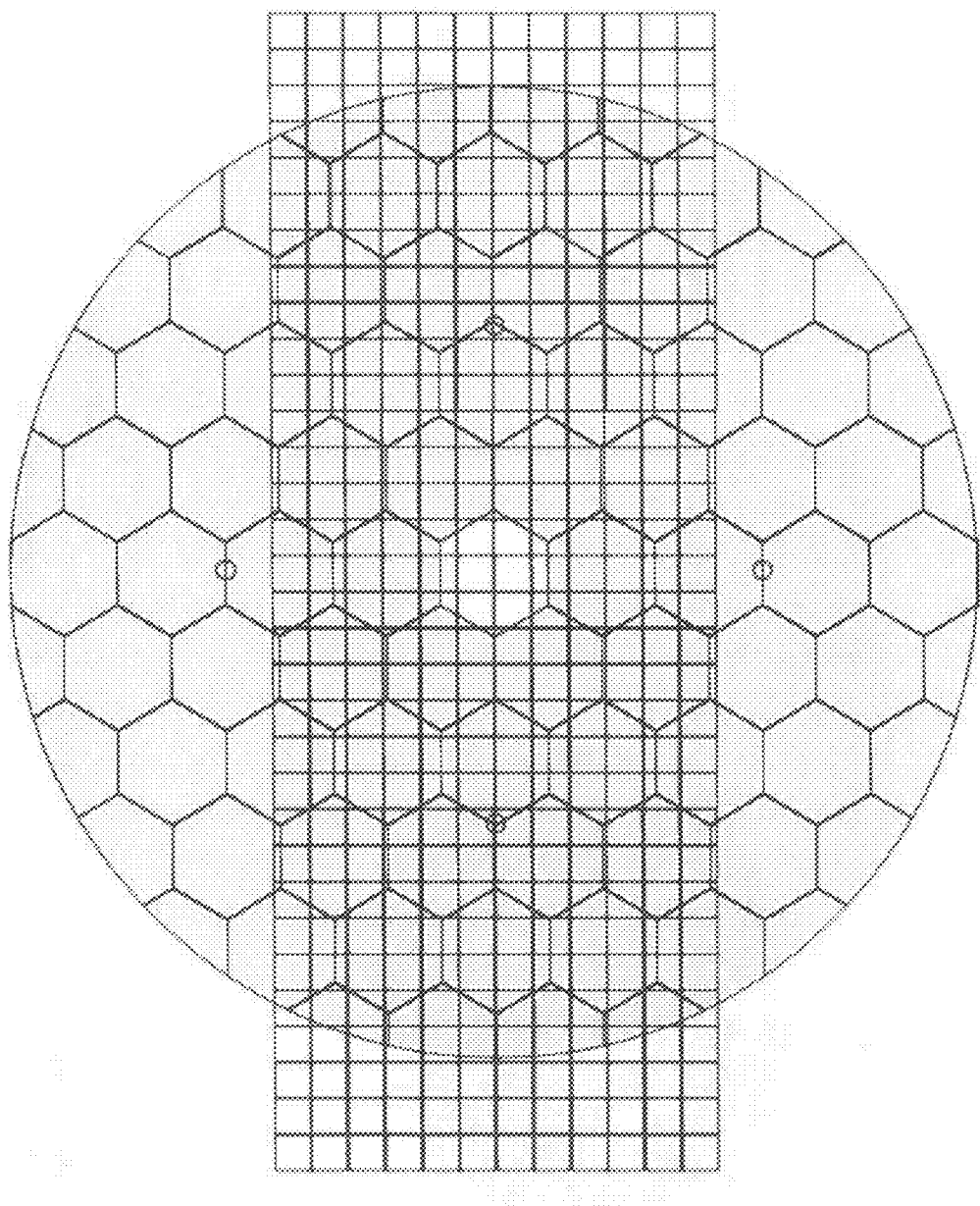
FIG. 9 provides a sub-millimeter imaging array (12×32 pixels) that coarsely samples the CSO primary mirror.

Both the pupil relay lenses and the Zernike phase plates were implemented in high-density poly ethylene (HDPE) plastic. The lenses were identical, plano-convex elements, the first of which was located near the nominal telescope focal plane (acting as a field lens). The second lens relayed the pupil such that it appeared at the nominal image plane. The subsequent reflective optics then performed their routine operation of relaying this image to the detector plane. The ray trace of the relay is shown in FIG. 8. The focal lengths were chosen such that the pupil was well sampled by the bolometer array, with a few un-illuminated pixels at the very edge. FIG. 9 shows the sampling of the COAT pupil by the pixels in the micro-bolometer array. The phase plates were specified to be of uniform thickness except for a small circular area 2.44 λ/D in diameter. This area had either a mesa or depression (pimple or dimple, colloquially) of magnitude λ/(4(n−1)), where lambda is the wavelength and n is the index of refraction of HDPE (here, assumed to be 1.5). The plates were made such that the pimple/dimple for each plate were concentric with respect to their locating mechanics. Plates were made for two wavelengths, 350 μm and 850 μm. The plates were not anti-reflection coated.

Figure 10:
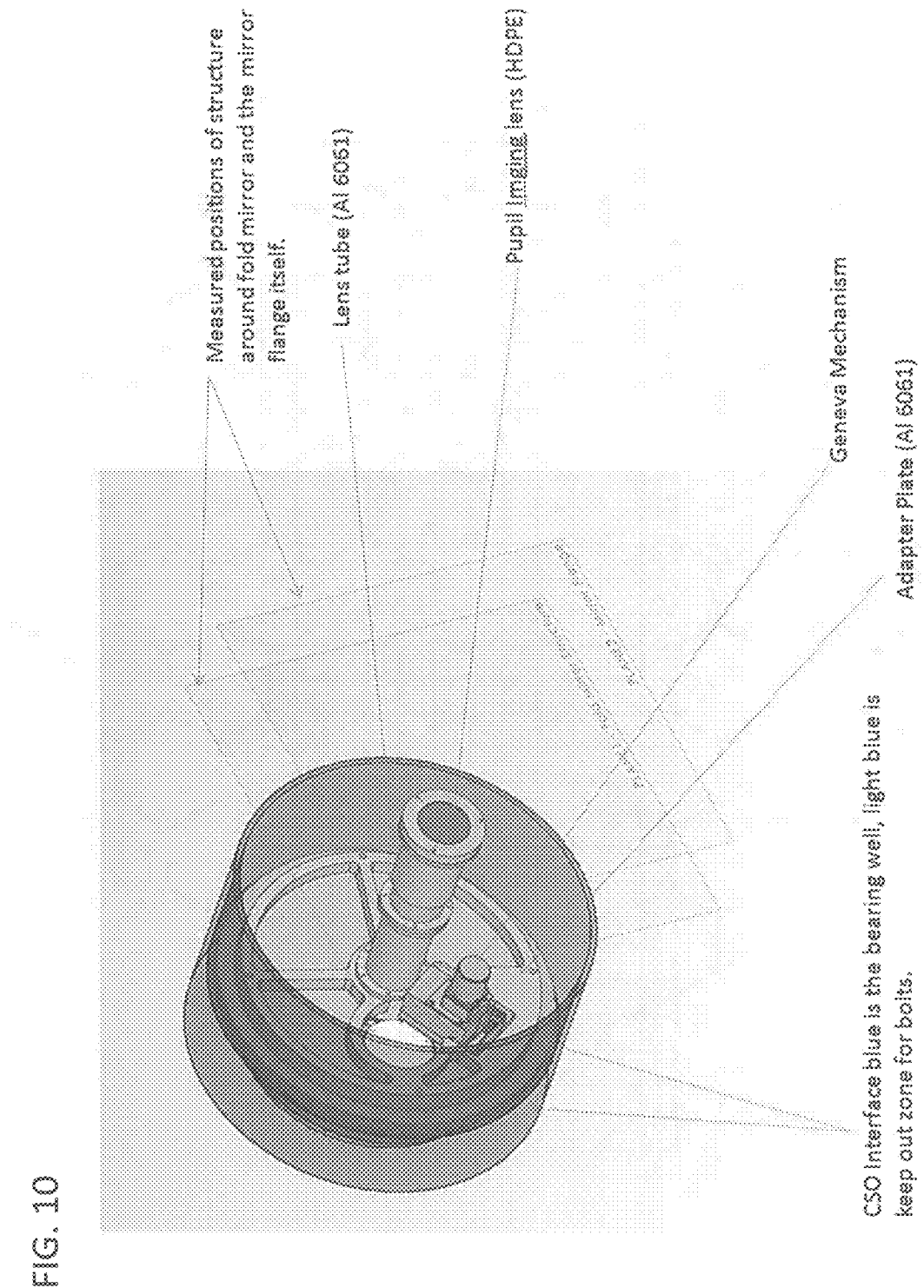
FIG. 10 provides a schematic of the transmissive dynamic Zernike waverfont sensor of FIG. 7 as mounted on the CSO telescope.

The mechanics were designed such that the pupil relay lenses (once carefully aligned) could be removed quickly and reinstalled with precision. Thus switching between pupil viewing mode and imaging mode was relatively fast and easy. The phase plates were rapidly moved into and out of the focal plane with the aid of a Geneva mechanism, which performed this at about 1 Hz. The Geneva mechanism has a state switch, which clearly identified when the phase plate was in the beam. The instrument software was modified such that data was taken synchronously with the Geneva mechanism. Further, all of these opto/mechanics were designed such that they could be easily mounted to the telescope using existing bolt holes designed for the bearing axis cover, as shown in FIG. 10.

To test this system, a calibrated phase error is created on the surface of the telescope and then measured with the Zernike technique. In this experiment, a piece of 5 mil mylar is attached to the primary mirror. The mylar covers about one segment panel (roughly 3×3 pixels in the imaging array). This mylar serves as the calibrated phase aberration to be measured in this experiment. In practice, a differential test is performed: first a Zernike phase measurement is made of the telescope plus mylar, and then the mylar is removed and another measurement made of the telescope alone. The difference of these two measurements is then the mylar measurement. It worth noting that during the night, as the object moves across the sky, the bolometer array appears to rotate about the center of the telescope pupi. Therefore, it is important that measurements be made as quickly to each other as reasonable.

Figure 11A:
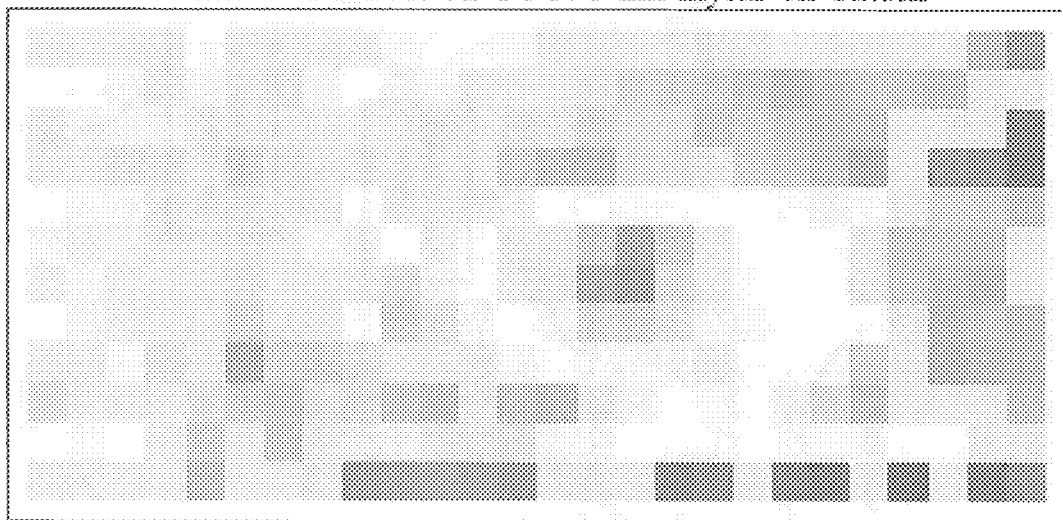
FIG. 11a provides a diagram showing the mylar as sampled by the sub-millimeter array, where the brightness of the object represents a phase excursion (The signal extends over roughly 3×3 pixels and is consistent with the physical size of the mylar on the telescope, and the whole telescope pupil runs about 27 pixels along the width of the above image).
Figure 11B:
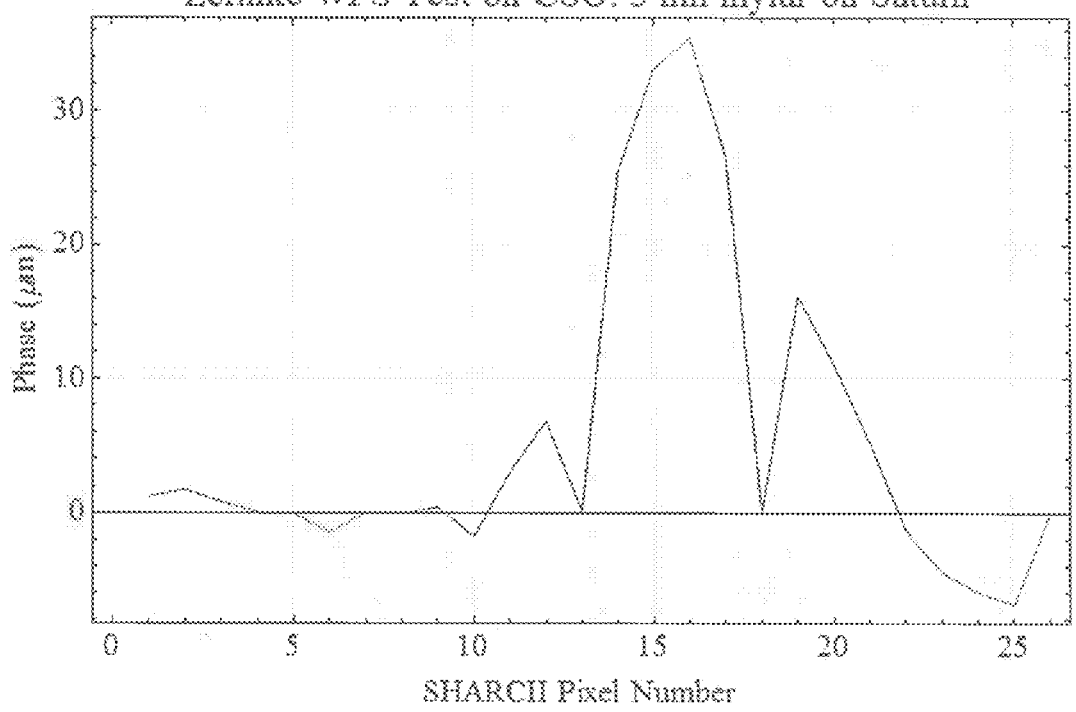
FIG. 11b provides a data plot of a slice through FIG. 11 at 5 row from the top, where the peak of the phase estimate is only ~35 µm, and is an underestimate of the expected signal of 125 µm.

An experimental run in accordance with the conditions provided above was conducted on the Caltech Sub-millimeter Observatory (CSO) from Mar. 28 to Mar. 30, 2012. Conditions were favorable for this observation, with water vapor quite low (τ~0.04, typically). Many different experiments were performed, using different wavelengths, different mylar thicknesses, and different pupil locations. Careful pointing and other alignment sensitivity tests were likewise performed. For the Zernike sensing demo the source was Saturn, and the mylar thickness was 5 mils (125 μm). In double pass, the phase error is twice the thickness multiplied by the mylar index of refraction minus one. Assuming an index of near 1.5, this corresponds to a phase error of 125 μm. The estimate was made by using nothing more than equation 14, the differenced pupil intensity measurements between two phase plate positions normalized by the pupil intensity from the source alone. The result of this estimate is shown in FIG. 11a. A slice through the estimate is shown in FIG. 11b. The signal is quite clear, and is well above the uniform signal from the pupil which had no phase aberration, and it occurs in the location expected based upon where it was placed on the primary mirror. However, the phase estimate of the Zernike technique (~35 µm, peak) is off by about a factor of four from the known phase error of the mylar thickness (125 µm). This is most readily explained by a normalization error which can be corrected with instrumental calibration.

Example 3

Reflective Zernike Wavefront Sensor

Although the above discussion focused on a dynamic transmissive Zernike design, an even simpler architecture is conceivable by using a reflective design. This reflective architecture has the advantages of removing the systematic errors that might occur in transmissive implementations. This alternative still accomplishes the requisite phase-shifting in the focal plane, but with an all reflective system. As will be described in detail below, the concept is to create an annular mirror with an internal piston element sized a few $\lambda/D$. This piston element would be place at a convenient focal point, ideally as close to the telescope as possible. It would be fabricated to be co-planar with the annular mirror, so that when not being used for wavefront sensing, it would have no impact on the optical beam train. The variable position of the central element would allow for wavelength variability. As will be discussed, this implementation would then not suffer from the same systematic errors of the existing, transmissive design.

Figure 13A:
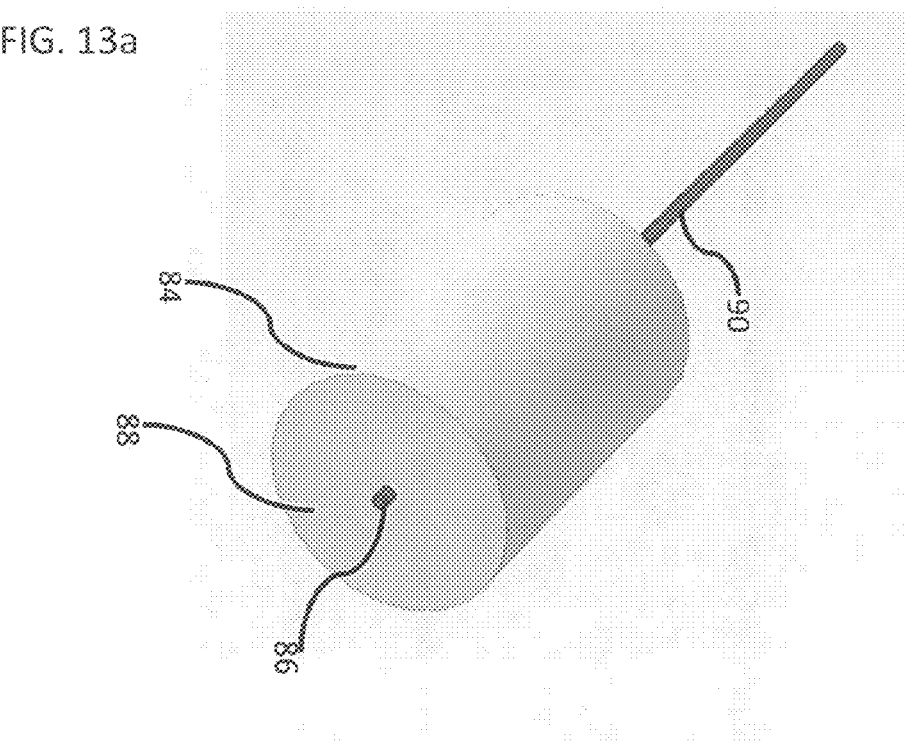
FIGS. 13a and 13b provide schematics and images of a reflective phase-shifting optical element in accordance with embodiments of the invention.
Figure 13B:
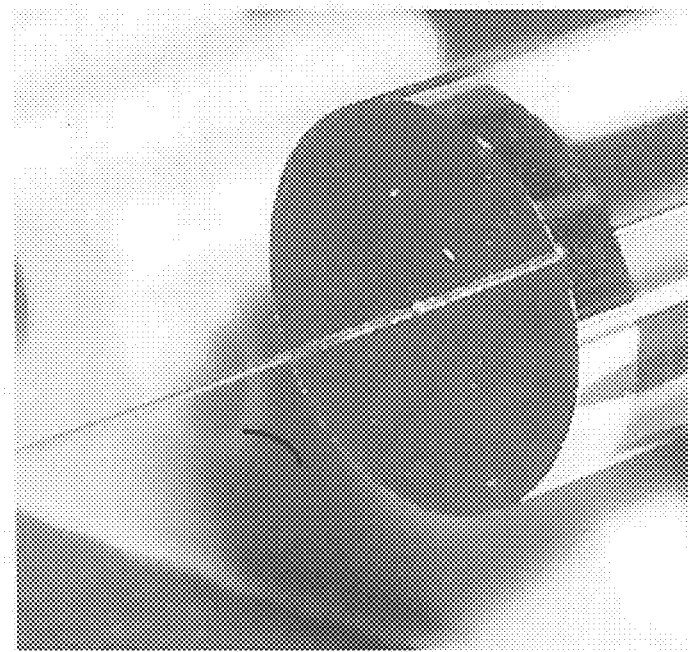
Figure 14:
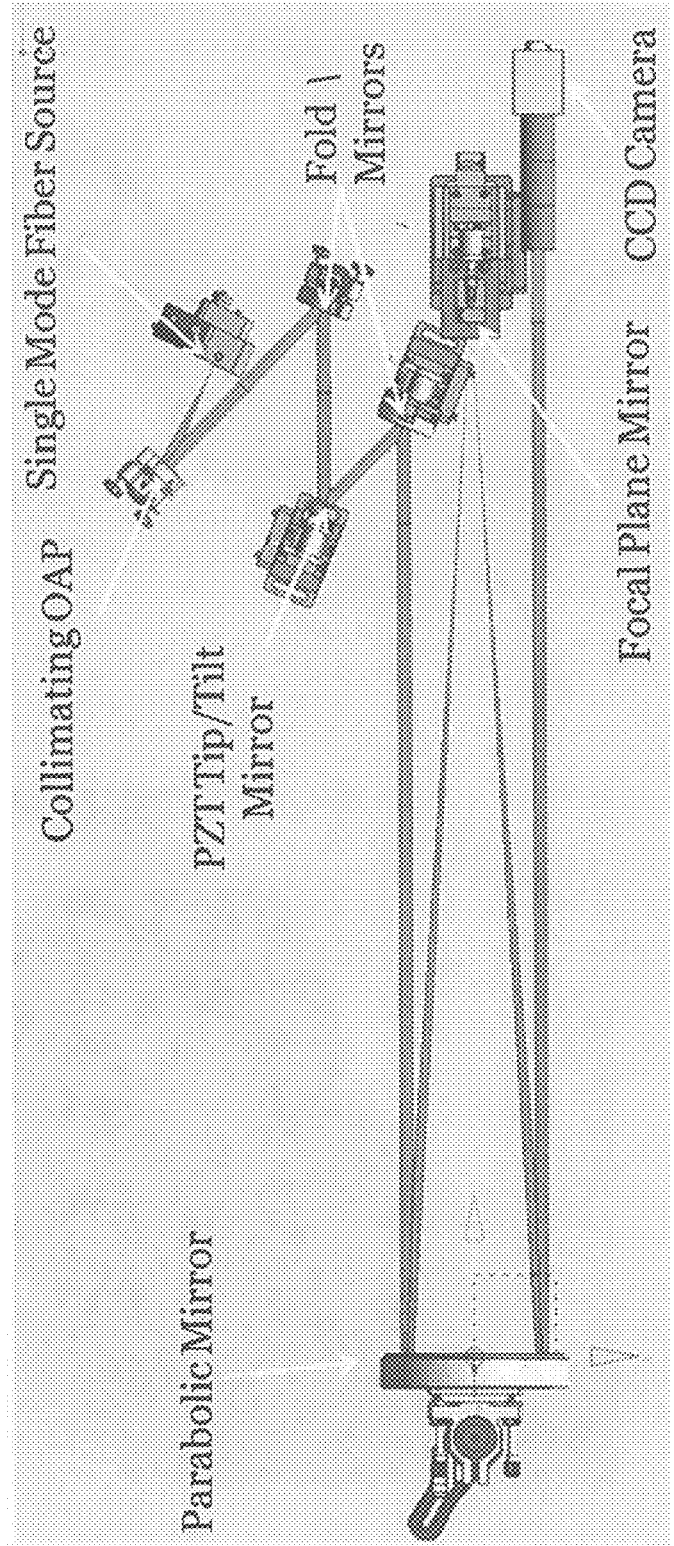
FIG. 14 provides a schematic of the opto/mechanical layout of an exemplary Zernike WFS testbed.

Accordingly, in some embodiments the dynamic Z-WFS is operated in a reflective system to operate broad-band and to make the phase step at the core of the PSF adaptive and variable such that it can be made to switch between $+\lambda/4$ and $-\lambda/4$ in short order. These modifications make the system simple and robust. Implementations according to some embodiments are illustrated in FIGS. 12 to 14.

Figure 12:
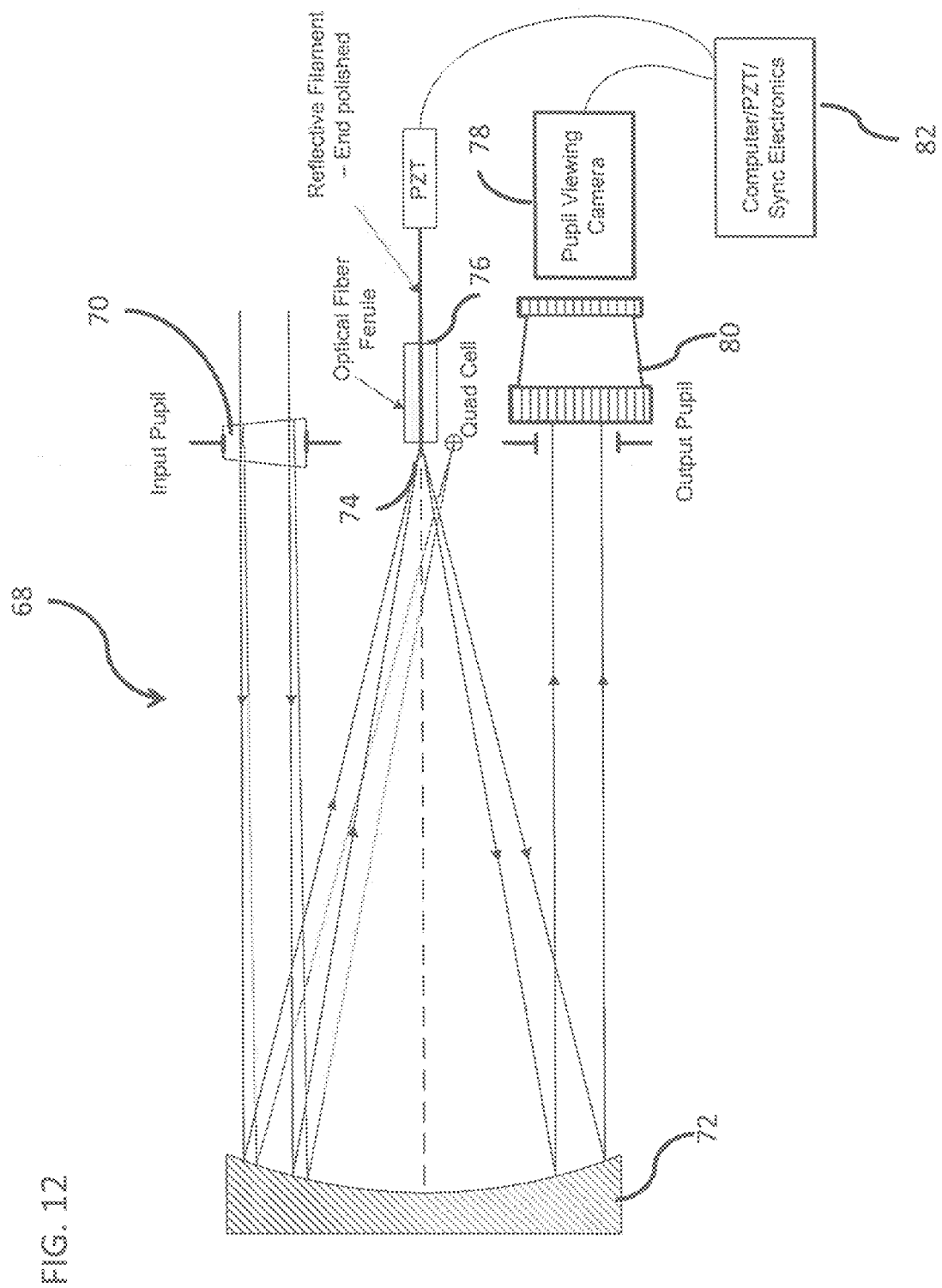
FIG. 12 provides a schematic diagram of a reflective dynamic Zernike wavefront sensor in accordance with embodiments of the current invention.

As shown in FIG. 12, in one architecture of a dynamic reflective Zernike wavefront sensor (68) the input pupil (70) is located at the front focal plane of a parabolic mirror (72). The light enters through this input pupil plane and reflects from an off-axis portion of the full parabola towards the focal point (74). Located at the focal plane is a special reflecting phase-shifting optical element (76). Upon reflection off of this optical element, the beam is re-collimated by the parabola, and forms a real image of the input pupil at the parabola focal length. This pupil is then imaged to the final detector (78) with a relay (80) that also shrinks the exit pupil image size as desired.

The reflective design makes this architecture insensitive to differential phase effects due to chromaticity and polarization. Moreover, the only phase difference between the core of the PSF and the remaining portion of the electric field is due to the reflecting phase-shifting optical element. Another nice benefit to this design is that it is entirely common mode. So, even though at its heart this is in an interferometer, because the beams co-propagate, they are unaffected by non-common path errors and vibrations that detrimentally impact the performance of other interferometers.

The heart of the dynamic reflective Zernike wavefront sensor is the reflecting phase-shifting optical element. Schematics and images of an embodiment of such an optical element are shown in FIGS. 13a and 13b. As shown, it consists of a fine mechanical assembly comprising a glass capillary tube (84) with a small inner orifice (86). The end face (88) of this capillary is end polished and coated with a reflective metal coating. Internal to this capillary is placed a single mode fiber, or similar glass filament (90), the end-face of which has been cleaved to be flat and normal to the central hole, and also coated with the same reflective coating as the capillary. The translation of tip of the glass filament with respect to the coated face of the capillary/ferrule provides the phase shifting of the PSF core.

During operation, the light reflects off this assembly and is re-collimated by the parabola. More specifically, in some embodiments the single mode fiber (or glass filament) is selected for its mechanical properties. In such embodiments, the outer diameter is controlled to very high uniformity in the outer diameter and with very tight tolerances on the error in the diameter. This single mode fiber (or glass filament) is centered and guided by the inner capillary but is otherwise free to move. The far end of the fiber is gripped in a clamping mechanism or the like and attached to a translator, such as a piezoelectric transducer (PZT). Using a PZT, very fine motions of the filament can be accomplished with small voltages, for example, the PZT may typically have a range of twelve microns for a change of 100 volts. Thus changes on the order of $+/-\lambda/4$ can be had for a voltage change of only 2.5 V. (The coarse positioning of the fiber is accomplished by an in-line linear stage.) The single mode fiber (or glass filament) is phase shifted by the PZT.

The interconnection between the fiber and PZT may be accomplished by any suitable means. For example, in some embodiments one end of the PZT is bonded to the ceramic ferrule or glass capillary, the other is bonded to the single mode fiber (or glass filament). In such embodiments, the bonding may be done in any matter suitable such that the polished end is flush with the ferrule face when the PZT is at mid-voltage. This ensures the phase shift has an equal stroke about its nominal position. Typical required stroke of the PZT is on the order of a few wavelengths for segment phasing, and only $+/-$ quarter of a wavelength for typical operation. As shown in FIG. 12, the PZT stroke/frame acquisition can be synchronized with dedicated timing electronics (82).

When the Z-WFS is in operation, the reflective filament makes a slight translation forward and back of $+/-\lambda/4$ (where lambda is the mean wavelength of operation). This very fine motion is accomplished with the PZT and is made synchronous with the frame capture of the imaging camera. By differencing and normalizing subsequent frames with positive and negative mirror offsets, the phase of the wavefront is accurately reconstructed. Because this process is done synchronously, any noise that is asynchronous with these measurements is removed in the differencing operation. Because the math of the reconstruction is so simple, it can be done very quickly, much fast than the traditional S-HWFS.

In some embodiment, a dedicated quad cell detector may be added to the system in order to ensure the PSF is well centered on the core of the axis of the ferrule. In such an embodiment, an out-of-band ghost image created by a judiciously wedged and coated optic at the input pupil provides an optical reference that is locked to the position of the beam under study. The quad cell detector is also physically referenced to the ceramic ferrule, carefully aligned and secured in place. Initial calibration of the pointing is done by retracting the fiber into the ferrule such that the reflective ferrule acts as a hard-edged coronagraph. In this configuration, the input PSF is then dithered in a cross-pattern, back and forth, up and down, while synchronous with the output pupil viewing camera. Proper differences of the back/forth and up/down images provides and signed error signal that in closed loop with the input dither mirrors, can center the beam extremely accurately. Once centered in this way, the reference position on the quad cell detector is recorded, and finally, the polished fiber is restored to its nominal position.

Testbed Opto/Mechanical Layout

An opto/mechanical testbed layout of the dynamic reflective Zernike architecture is shown in FIG. 14. In this embodiment, the input beam is from a single mode optical fiber. The fiber allows us to easily change the source between a laser and white light without any changes to the optical alignment. The beam is collimated with an off-axis paraboloid to ensure broadband operation. A fold mirror feeds the beam to a PZT tip/tilt mirror which is located at the input pupil. The phase aberrations are placed in the space between these two fold mirrors. Another fold mirror then directs the beam to the parabola. Our parabola is has a focal length of 914.4 mm, and we have a nominal input pupil diameter of 10 mm. The f/# is then f/91.44 and the Airy diameter is 2.44 $\lambda$f/#=144.2 microns. The filament diameter is about 122 microns which corresponds to a width of 2.1 $\lambda$/D. The beam is relayed to the CCD camera with a simple pair of achromatic lenses. This lens relay magnifies the pupil by −0.4 such that the final pupil is 4 mm on the CCD. Our CCD is an SBIG ST-402ME with an array size of 765×510 and a pixel size of 9 microns.

In order to analyze the performance of the reflective Zernike wavefront sensor, an end-to-end simulation was constructed. The simulation has been used for three types of error analysis: Fourier mode analysis, and Zernike mode analysis. In the simulation, phase errors are introduced into the electric field with uniform amplitude at the input pupil, and this modified electric field is propagated to the image plane. At the image plane, a mask corresponding to the lab filament size is applied to the electric field. In this way, a phase shift is applied only to the region of light incident on the fiber portion of the image plane. The shifted and unshifted portions of the electric field are recombined at the output pupil, where the intensities are used to calculate the phase (EQ. 14).

Figure 15:
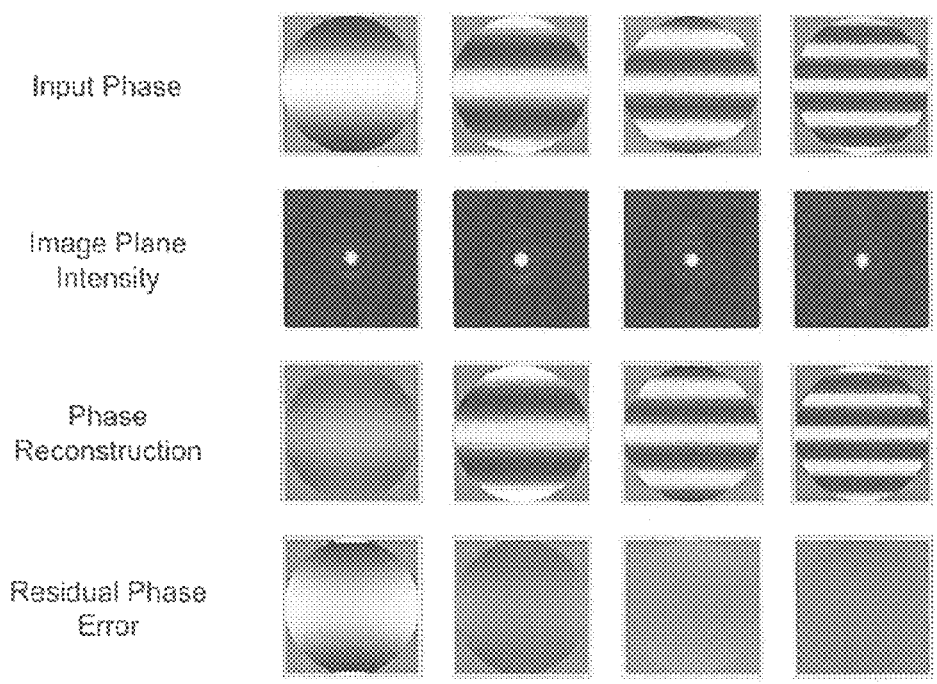
FIG. 15 provides the data results of sinusoidal input phase errors of different spatial frequencies result in characteristic light spots below and above the PSF core in the image plane.

The sensitivity of the Zernike WFS to Fourier modes was analyzed using a series of sinusoidal input phases with different spatial frequencies, or different numbers of cycles across the input pupil. A sinusoidal input phase introduced at the input pupil results in characteristic features at the image plane: two light spots are introduced above and below the PSF core. For lower spatial frequencies, these two spots are very close to the PSF core and about the size of the phase-shifting filament. As the spatial frequency increases, the spots move farther away from the PSF core, resulting in improved phase reconstruction. FIG. 15 demonstrates the relationship between the input phase spatial frequency, image plane features, phase reconstruction, and residual phase error.

Figure 16A:
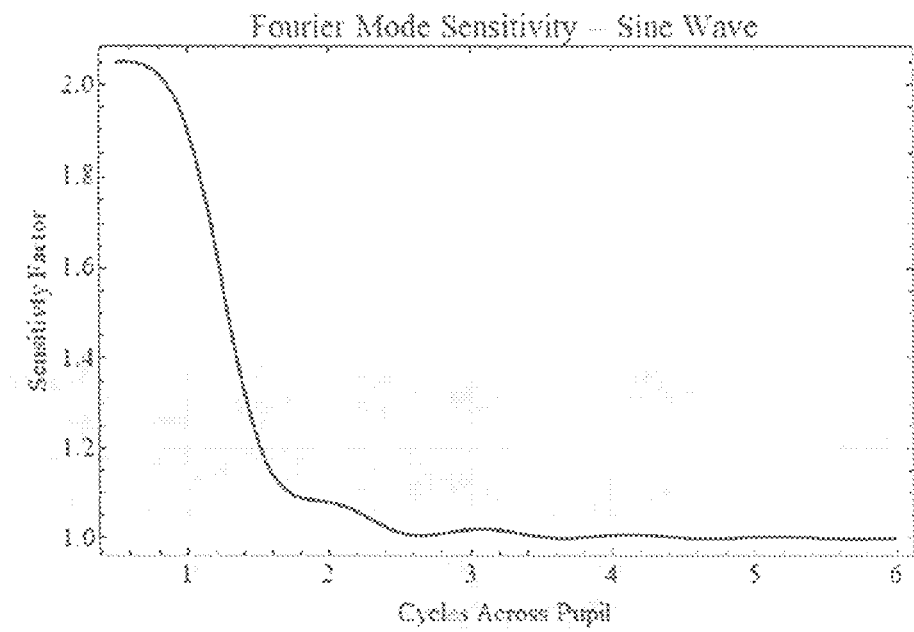
FIGS. 16a and 16b provide data showing that the phase reconstruction sensitivity factor β goes to one for higher spatial frequencies.
Figure 16B:
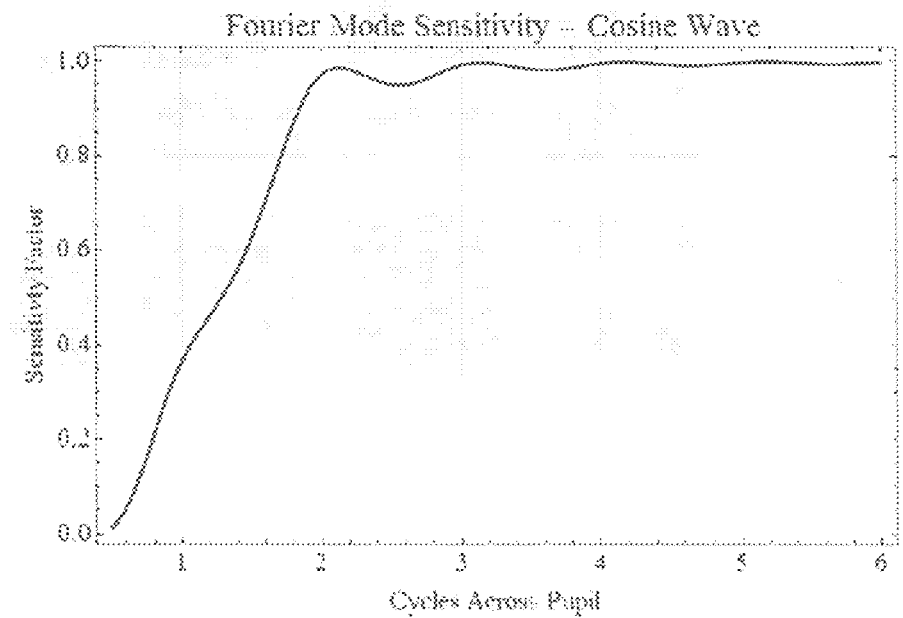

The results illustrated qualitatively by FIG. 15 are shown quantitatively in FIGS. 16a and b. These figures demonstrate the improved phase reconstruction for higher spatial frequencies by plotting a reconstruction "phase scaling term." This sensitivity parameter determines the magnitude of the input phase that is actually measured in the phase reconstruction algorithm. This parameter is determined as:

$$\beta = \frac{\int \phi_{est} \cdot \phi_{input}}{\int \phi_{input} \cdot \phi_{input}} \quad (20)$$

where the integrals are taken over the entire pupil. For a perfect phase reconstruction, the scaling term $\beta$ goes to one. FIG. 16 show that $\beta$ approaches one for high spatial frequencies.

Figure 17:
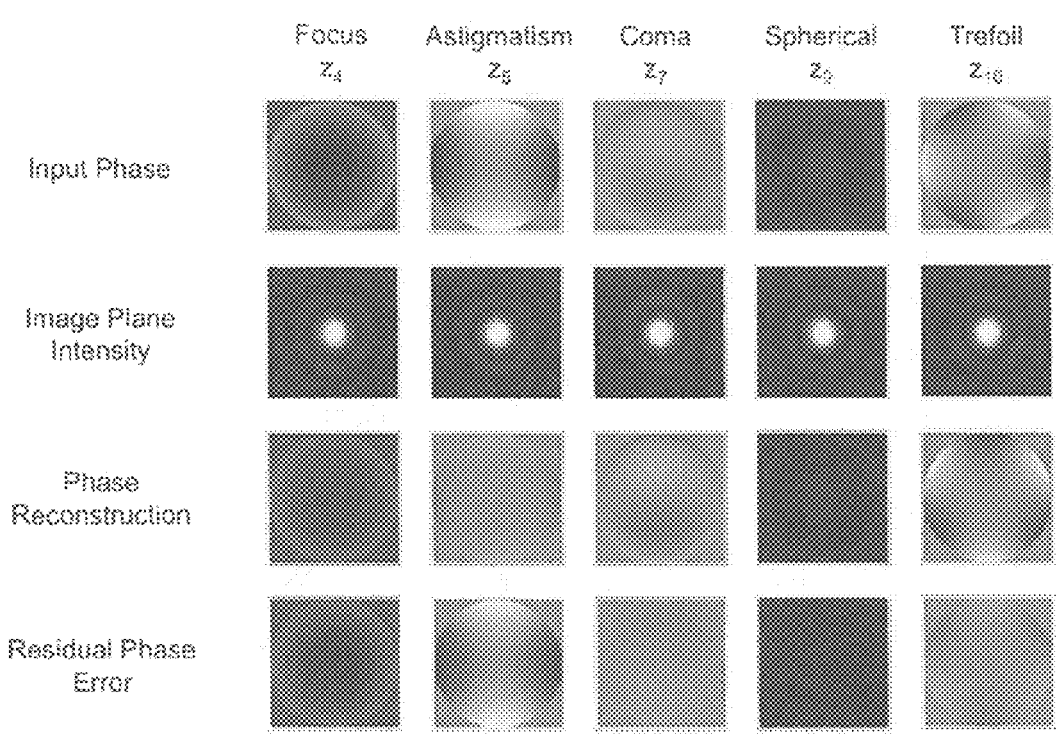
FIG. 17 provides data showing the input phase, image plane intensity, phase reconstruction, and residual phase error for five Zernike terms.
Figure 18:
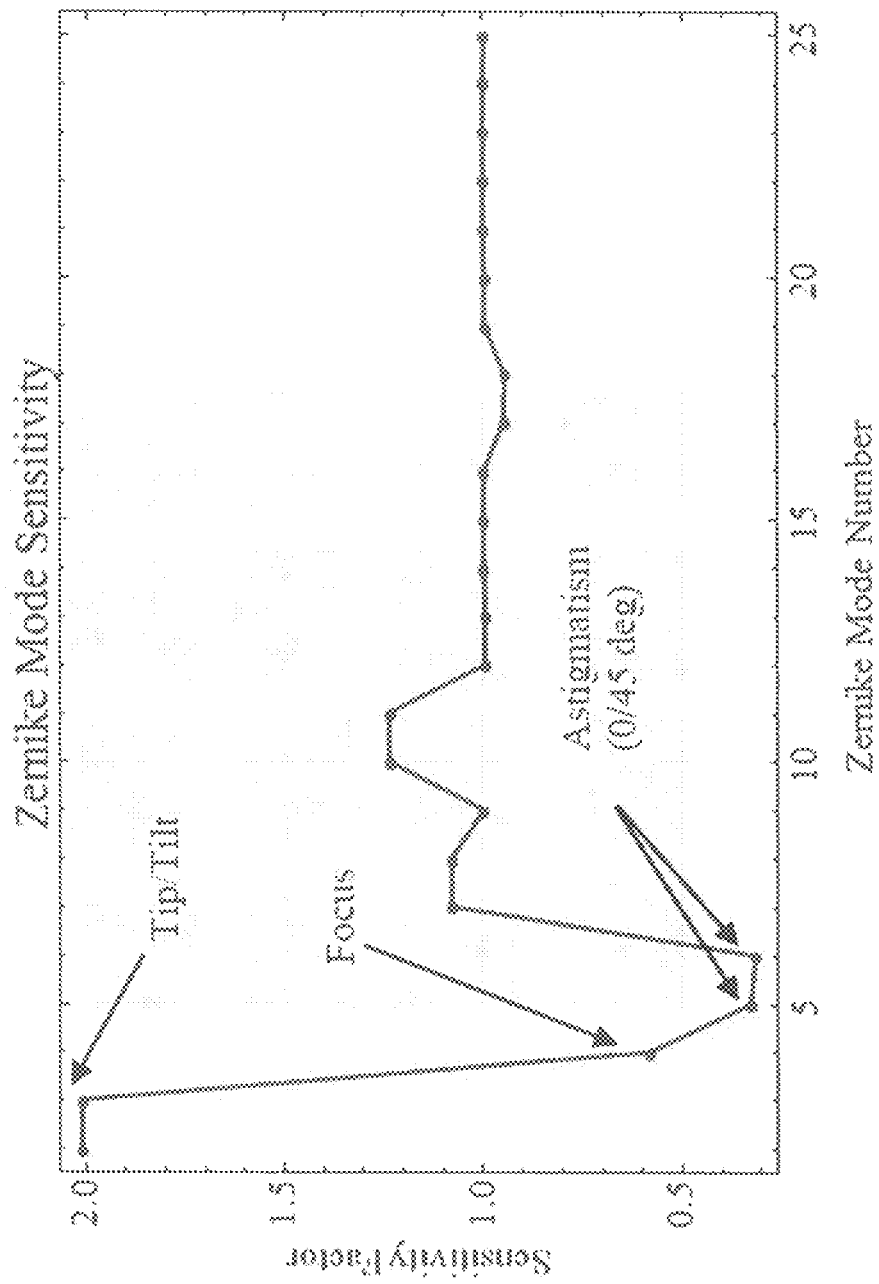
FIG. 18 provides data showing the phase reconstruction sensitivity factor, β, as a function of Zernike term is shown for the first twenty-five Zernike terms for a central piston element of size ~2 λ/D.

The sensitivity of the simulated wavefront sensor to Zernike modes was first analyzed by calculating the residual phase error for five individual Zernike terms. As expected, first the wavefront sensor was found to be less sensitive to low Zernike modes and more sensitive to high Zernike modes. FIG. 17 shows the input phase, image plane intensity, phase reconstruction, and residual phase error for Zernike terms 4, 5, 7, 9, and 10, while the results shown in FIG. 18 confirms the sensitivity curve for the first 25 Zernike terms. In other words, similar to the Sine wave analysis done for the Fourier Modes, the Zernike WFS is very sensitive to tip/tilt, but is less sensitive to low order modes. As the Zernike modes increase, the PSF energy moves to higher spatial frequencies and away from the phase-shifting element near the core of the PSF. The result is that the reconstructed phase gets progressively better.

Implementation on Palomar Observatory

Figure 19:
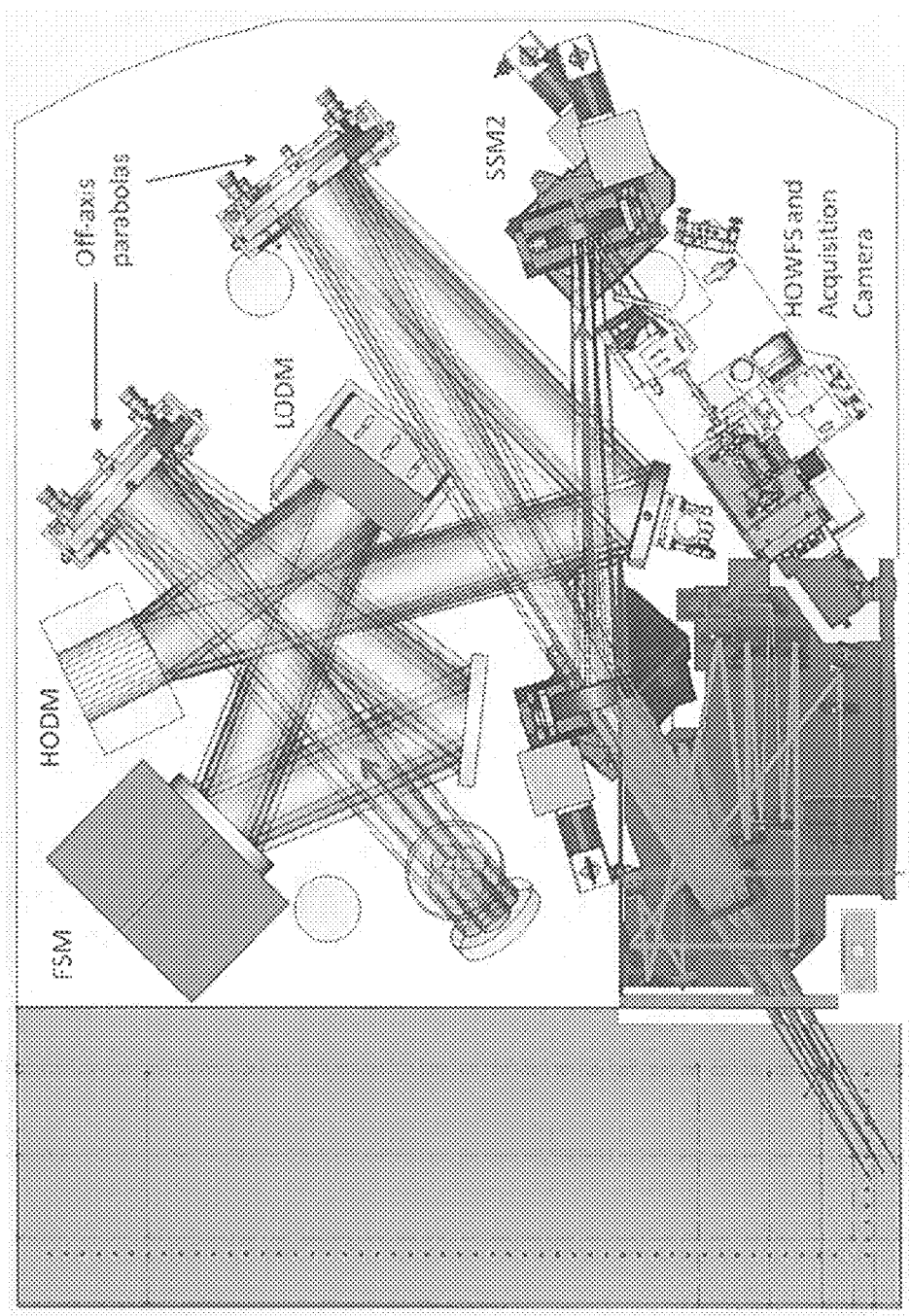
FIG. 19 provides a schematic of an opto/mechanical hardware implementation in accordance with embodiments of the invention as integrated into the Palomar observatory adaptive optics system.

An opto-mechanical relationship between pupil and image planes similar to that shown for the testbed devices was implemented for the Palomar system. However, there was an additional constraint that the wavefront sensor had to be done in such a way as to have little to no impact on the routine operation of the system: the existing Shack-Hartmannwavefront sensor would remain, and the Zernike wavefront sensor would not otherwise interfere with routine operation. In addition, the optics had to fit within a very tight volume constraint. FIG. 19 shows the Zernike wavefront sensor integration with the Palomar adaptive optics system. The adaptive optics system is shown in the central part of the diagram. The Zernike wavefront sensor is added after the pick-off beamsplitter for the Shack-Hartmannwavefront sensor. It fits within the small rectangular area after the P3K adaptive optics system and before the science instrument.

In detail, during operation the pick-off beamsplitter directs the on-axis beam first to a fold mirror and then to an off-axis parabolic mirror. This parabolic mirror collimates the beam and creates a real image of the telescope pupil. The effective focal length of the telescope is located at this pupil location as well, making it a telescentric telescope. The fold mirrors feed this beam into the telescope which is composed of a parabolic primary mirror and a slow secondary mirror. At the focal point of this telescope system is located the same phase-shifting element used in the lab. Traversing back through the telescope optics from this focal plane element, the exit pupil is again formed at the effective focal length of the system, which is quite long. A couple of oversized fold mirrors are required in order to bring this output pupil image close to the final imaging camera. A small relay then images this pupil onto the wavefront sensor detector array. The mechanics are made to be non-adjustable save for manual clocking and tilts accomplished via shimming. Optics and mechanics are mounted onto a small breadboard that allows for stand-alone testing before installation as a whole integrated system into the P3K system.

Interfacing to the Palomar adaptive optics system requires careful attention to requirements for real-time communication. It starts by adopting as much of the physical layer in the AO implementation as possible. This ensures compatibility and a high level of confidence that the hardware will operate as required. The description below essentially follows the path of the data from the wavefront sensor camera to the point where it is integrated into P3K system.

In this implementation, the wavefront sensor camera is a CCD39 from e2v. It is a four port camera with 40×40 pixels per port. This camera previously served as the wavefront sensing camera for the low-order adaptive optics system at Palomar. It can sample at speeds up to 2 kHz, with very low read noise and dark current. The sensor has its own set of electronics (commonly known as 'Little Joe' electronics from Scimeasure Analytical Systems, Inc.). Data is transmitted to the Zernike WFS computer via camera link protocol but implemented as a fiber-optic Tr/Rx pair by EDT, Inc.

The computer used was a HP 4800 Workstation operating with Suse Linux, enterprise edition. The fast computing will be done with the same Nvidia GPU cards as used the by AO system. The reconstruction algorithm is very simple (a difference and scaling operation), and does not require extensive compute resources. However, having a common hardware and software development environment for doing these operations makes work efficient. We plan on using the extensive computing power to do future wavefront estimation improvements. The computer is used to estimate the residual phase error from the ZWFS camera, from this phase error, the new values for the low-order and high-order deformable mirrors (LODM and HODEM respectively) are generated. These results are then sent PCO where they are integrated.

For the communications, a Quadrics network is used, again adopted wholesale from the Palomar system. A single Quadrics network card is installed in our machine, and interfaces to the rest of the system via the Quadrics QsNet 16 port switch. The switch relays data to PCO where the instrument control occurs. The HODM and LODM offsets are integrated into the control scheme with their own separate gain values. In this way, the ZWFS signals can be integrated into the control system with very little impact to the current operation of the system.

The reflective, phase-shifting Zernike Wavefront Sensor as presented here has the same benefits as the original, static Zernike phase-contrast sensor in that it is simple, and common-mode. However, the dynamic phase-shifting capability also suppresses systematic noise sources like polarization variation, and the reflective design makes it insensitive to wavelength. This is because by dynamical changing the phase delay from first positive and then to negative and cycling back again in this pattern, means that it is possible to reject noise sources that are not at the same modulation frequency (a very powerful technique for rejecting fundamental noise sources). The sensitivity analysis for both the Zernike aberrations and Fourier modes indicates some insensitivity to low-order modes. However, knowledge of this can be used in post-processing to recover the low-order signals.

Example 4

Refractive Wavefront Sensor

Figure 20:
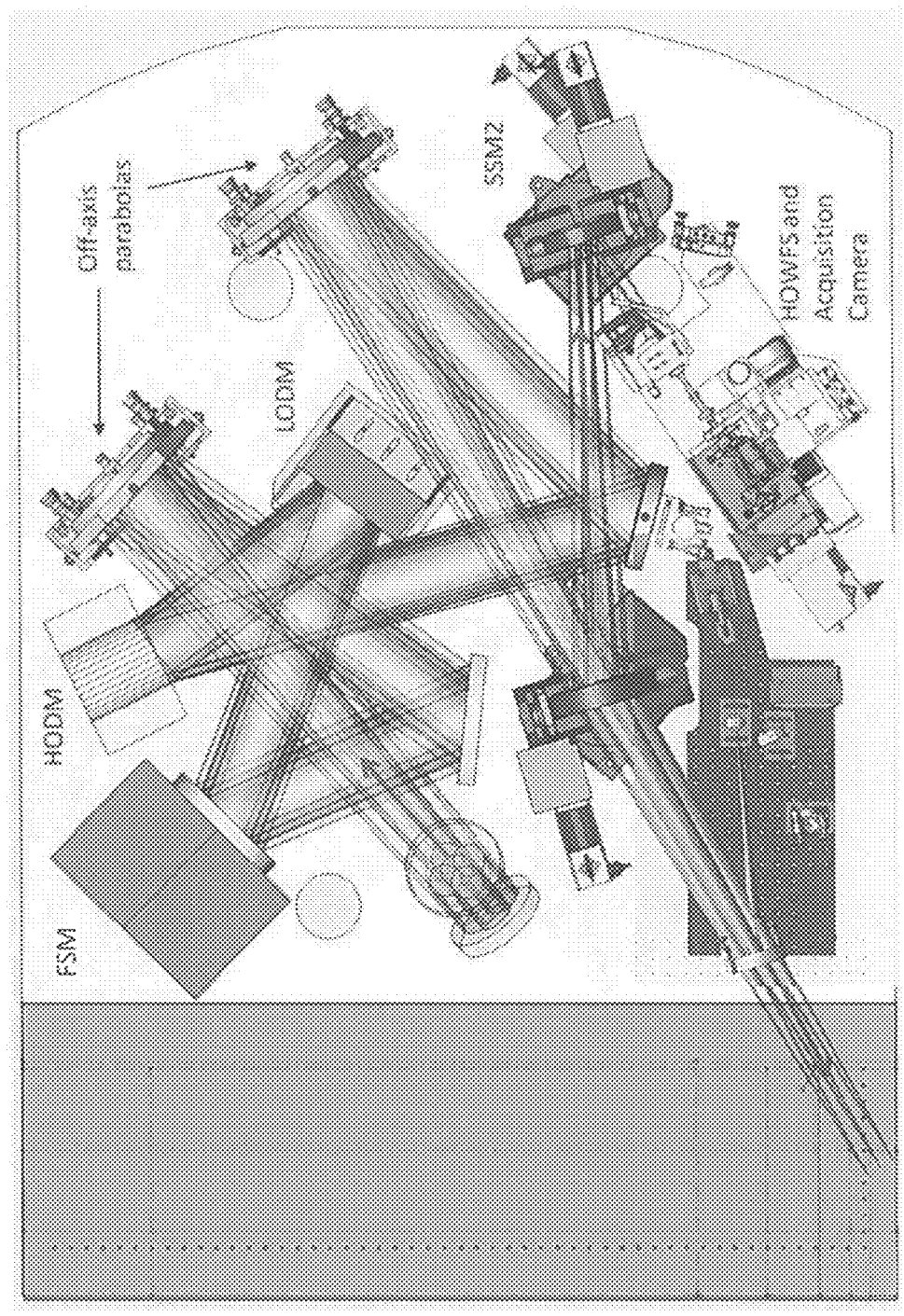
FIG. 20 provides a schematic of an opto/mechanical hardware implementation of a refractive design in accordance with embodiments of the invention as integrated into the Palomar Observatory adaptive optics system.

A refractive implementation of the Zernike WFS for Palomar has also been designed. Embodiments of this refractive wavefront sensor are shown in FIG. 20. It is possible to implement such a refractive system when: 1) the beam convergence at the intermediate image plane is slow enough that it can be further diverged (to match PSF size with the physical dimensions of the reflective phase-shifting assembly) with a transmissive element (in our particular case the f/16 of the Palomar telescope is changed to an ~f/100 beam with a negative achromatic doublet), and 2) the pupil can be re-imaged to the Z-WFS detector with a simple achromatic, transmissive element. This is the case for the Palomar optical system.

Example 5

Differential Viewing Modes

Figure 21A:
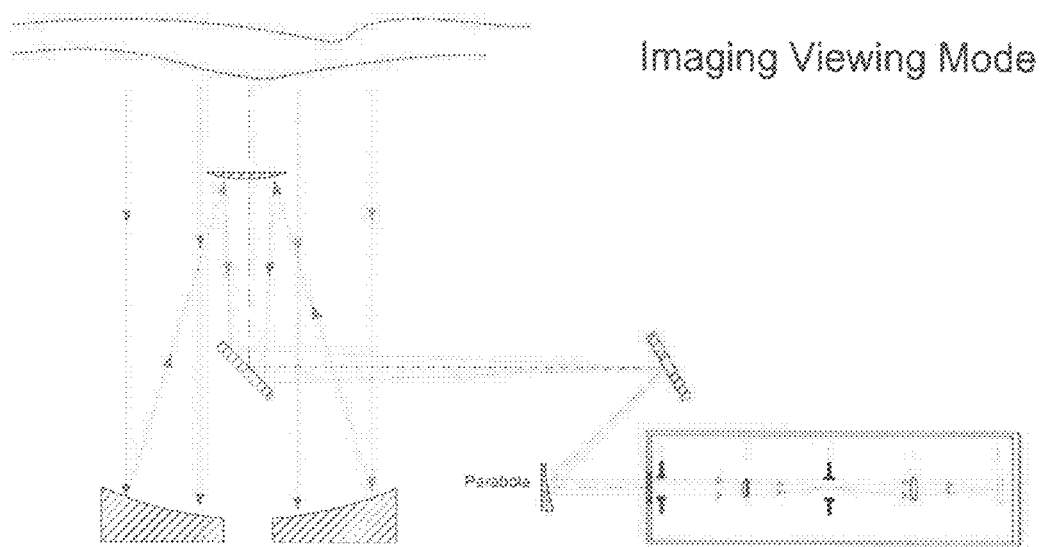
FIGS. 21a and b provide schematics of embodiments demonstrating viewing mode switching capability in accordance with the invention.
Figure 21B:
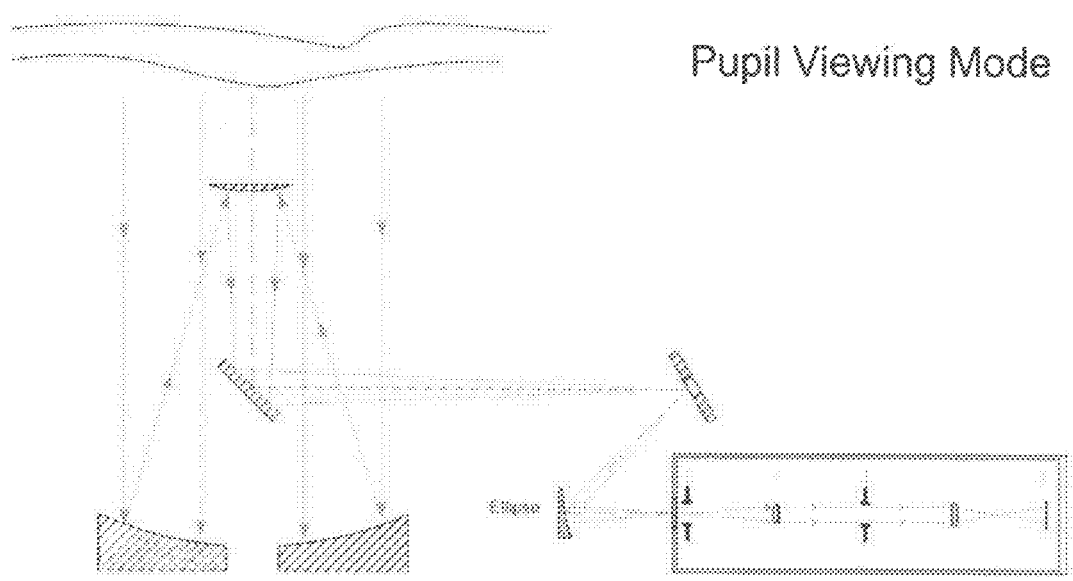

In addition to the above advantages, the hybrid wavefront sensors of the invention allow for the simple removal of the Z-WFS from the optical path, and for switching the viewing mode. For example, switching between imaging mode and pupil-viewing modes could be accomplished by simply switching a single reflective optical element of different power. FIGS. 21a and b show that in one embodiment this could be conceivably done with a switch between a parabolic and elliptical reflector. The field stop and pupil stop in the subsequent science instrument switch places in this design.

SUMMARY

An optical architecture for a hybrid phase-shifting Zernike wavefront sensor and various embodiments of dynamic wavefront sensor architectures have been presented. These sensors have many benefits of a common-mode wavefront sensor (in particular its insensitivity to vibration and air-turbulence). However, in certain embodiments it has the additional benefits of: 1) being reflective such that it operates broad-band and is completely polarization sensitive; and 2) is phase-shifting. The phase-shifting property allows this sensor to reject the 1/f noise of the detector and also reject noise to do stray light. Moreover, it can easily be configured to run in two different modes: 1) long-stroke mode for phase aberrations with large excursions and 2) small-stroke mode when the aberrations are known to be much smaller than a wavelength. These two modes require a larger stroke on the phase-shifting element, but this is easily accomplished by applying a larger voltage on the PZT element that drives the active element. The small-stroke phase reconstruction algorithm was presented above and is still valid. For the large-stroke algorithm, the fundamental operation is to detect the 'white-light' envelope for each pixel in the pupil-viewing camera. This is done by measuring the group delay of each white light fringe that is recorded in each pixel in the pupil viewing camera. This is accomplished by measuring the slope of the imaginary part FFT of each pixels fringe pattern.

The sensor has a host of attractive features which make it well suited for many types of adaptive optics. First, it is strictly reflective and therefore operates broadband, second it is common mode and therefore does not suffer from systematic errors (like vibration) that are typical in other interferometers, third it is a phase-shifting interferometer and therefore benefits from both the sensitivity of interferometric sensors as well as the noise rejection afforded by synchronous detection. Unlike the Shack-Hartmannwavefront sensor, it also has nearly uniform sensitivity to all pupil modes. In space, for instance, where the optical quality is not degraded by the Earth's atmosphere, the image quality is already good enough that a S-HWFS is not required. However, because a Z-WFS is so much easier to implement, and because the mathematics to reconstruct the image quality is very simple, adding this functionality to space telescopes is simple, easy and comes with little additional cost or complexity.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. Accordingly, the present invention is not limited to the specific embodiments described herein but, rather, is defined by the scope of the appended claims.

What is claimed:

1. A hybrid wavefront sensor comprising:
   a Shack-Hartmann wavefront sensor having a SH-input pupil and a re-imaged SH-output pupil comprising at its distal end a lenslet array for dicing an incident image wavefront into separate segments;
   a Zernike wavefront sensor having a Z-input pupil and a Z-output pupil, the Zernike wavefront sensor being capable of dynamically shifting the phase of a portion of the image wavefront having a diameter on the order of $\lambda/D$, where D is the SH-input pupil diameter;
   a relay optical system disposed proximal to the lenslet array and designed such that the image wavefront from the SH-input pupil is relayed one-to-one to the Z-input pupil and the Z-output pupil is relayed one-to-one to the lenslet array of the SH-output pupil;
   a detector in optical alignment with the distal side of the lenslet array for imaging the incident image wavefront; and
   an electronic controller in signal communication between the Zernike wavefront sensor and the detector for correlating the phase shift imposed on the imaged wavefront.

2. The hybrid wavefront sensor of claim 1 wherein the optical path of the wavefront sensor is arranged such that the Zernike wavefront sensor may be bypassed.

3. The hybrid wavefront sensor of claim 1 wherein the phase shift may be dynamically adjusted over a range of from $+\lambda\Lambda/2$ and $-\lambda/2$.

4. The hybrid wavefront sensor of claim 1 wherein the relay optical system includes a parabolic mirror.

5. The hybrid wavefront sensor of claim 1 wherein the Zernike wavefront sensor is transmissive.

6. The hybrid wavefront sensor of claim 5 wherein the Zernike wavefront sensor comprises a plurality of transmissive phase plates movable into and out of the optical path of the Zernike wavefront sensor, each of said transmissive plates capable of producing a different phase shift in the image wavefront.

7. The hybrid wavefront sensor of claim 1 wherein the Zernike wavefront sensor is one of either reflective or refractive.

8. The hybrid wavefront sensor of claim 7 wherein the Zernike wavefront sensor includes a reflective mechanical capillary device.

9. The hybrid wavefront sensor of claim 8 wherein the reflective mechanical capillary device comprises:
   a ceramic ferrule defining a central longitudinal hollow passage and having a reflective end; and
   a fiber having a reflective end, said fiber being positioned within the central hollow passage and movable therein such that the reflective end of the fiber can be offset relative to the horizontal plane of the reflective end of the ceramic ferrule.

10. The hybrid wavefront sensor of claim 9 further comprising a piezoelectric transducer mechanically coupled to the fiber and disposed to translate said fiber within said ferrule.

11. The hybrid wavefront sensor of claim 9 further comprising a quad cell detector to determine the position of the image wavefront with respect to the reflective mechanical capillary device.

12. The hybrid wavefront sensor of claim 1 wherein the relay optical system comprises both a parabolic and elliptical reflector, and wherein the optical path of the sensor is switchable therebetween.

13. The hybrid wavefront sensor of claim 1 wherein the relay optical system includes a refractive element.

* * * * *